US012746640B2

(12) United States Patent
Rowland et al.

(10) Patent No.: US 12,746,640 B2
(45) Date of Patent: Sep. 29, 2026

(54) SILENCER FOR A BLAST NOZZLE

(71) Applicant: BLASTONE TECHNOLOGY PTY LTD, Murarrie (AU)

(72) Inventors: Matthew David Campbell Rowland, Camberwell (AU); Trevor Andrew Seewald, Upper Kedron (AU); Ingo Johannes Henri Jahn, Upper Brookfield (AU); Phillip Bradley Swann, Redbank Plains (AU)

(73) Assignee: BLASTONE TECHNOLOGY PTY LTD (AU)

( * ) Notice: Subject to any disclaimer, the term of this patent is extended or adjusted under 35 U.S.C. 154(b) by 560 days.

(21) Appl. No.: 18/039,598

(22) PCT Filed: Dec. 2, 2021

(86) PCT No.: PCT/AU2021/051437
§ 371 (c)(1),
(2) Date: May 31, 2023

(87) PCT Pub. No.: WO2022/115910
PCT Pub. Date: Jun. 9, 2022

(65) Prior Publication Data

US 2024/0025016 A1 Jan. 25, 2024

Related U.S. Application Data

(60) Provisional application No. 63/120,418, filed on Dec. 2, 2020.

(30) Foreign Application Priority Data

Dec. 2, 2020 (AU) ................................ 2020904468

(51) Int. Cl.
*B24C 5/04* (2006.01)
*B05B 1/00* (2006.01)

(52) U.S. Cl.
CPC ................ *B24C 5/04* (2013.01); *B05B 1/002* (2018.08)

(58) Field of Classification Search
CPC ........... B24C 5/02; B24C 5/04; B24C 7/0046; B24C 1/00
See application file for complete search history.

(56) References Cited

U.S. PATENT DOCUMENTS 3,628,627 A * 12/1971 Arnold ...................... B24C 5/02 181/255
3,982,605 A * 9/1976 Sneckenberger ....... B05B 1/005 239/DIG. 21

(Continued)

FOREIGN PATENT DOCUMENTS

| | | | |
|---|---|---|---|
| CA | 2616403 | A1 | 6/2009 |
| WO | 2020/123697 | A1 | 6/2020 |
| WO | 2022/020898 | A1 | 2/2022 |

OTHER PUBLICATIONS

Gula, John. "What Size Compressor is Required for Sandblasting?" Aug. 20, 2014. <https://petroleumservicecompany.com/blog/what-size-compressor-is-required-for-sandblasting/?srsltid=AfmBOoqhcLUaHVThhpvA-H8r1Nj9mchcDxxHK--I7HH7QIwL5FddYa0o>)>. (Year: 2014).*

(Continued)

*Primary Examiner* — Joel D Crandall
(74) *Attorney, Agent, or Firm* — RowanTree Law Group, PLLC; Joseph W. Schmidt

(57) ABSTRACT

A noise suppressed blasting system comprising:
- a source of blasting gas in a predetermined pressure range with abrasive particles entrained therein;
- a nozzle including
  - a nozzle inlet for connection to the source of blasting gas,
  - a nozzle outlet for emission of the blasting gas, (Continued)

a nozzle conduit from the nozzle inlet to the nozzle outlet including a throat therebetween with a ratio of area of the nozzle outlet to area of the throat selected to emit the blasting gas from the nozzle outlet to produce a supersonic jet;

a silencer connectable to the nozzle, to receive the supersonic jet exiting the nozzle, the silencer comprising a body with a silencer conduit therethrough, the body being of sufficient length and diameter to cause a flow condition of the jet received from the nozzle outlet to be modified such that 1½ shock cells are created in a jet inside the silencer, no shock cells are created in the jet outside the silencer and a jet exits the silencer in the form of a core jet with an established turbulent shear layer thereabout and entraining an annular jet located around the core jet.

3 Claims, 23 Drawing Sheets

(56) References Cited

U.S. PATENT DOCUMENTS

| | | | | |
|---|---|---|---|---|
| 5,390,450 | A | 2/1995 | Goenka | |
| 5,975,996 | A | 11/1999 | Settles | |
| 6,112,850 | A * | 9/2000 | Secrest | F04D 29/663 454/906 |
| 11,801,519 | B2 * | 10/2023 | McCreary | G10K 11/16 |
| 2010/0163336 | A1 | 7/2010 | Presz, Jr. et al. | |
| 2019/0134780 | A1 * | 5/2019 | Hursen | B24C 1/10 |
| 2020/0130140 | A1 * | 4/2020 | Sullivan | B24C 3/02 |

OTHER PUBLICATIONS

EP Office Action, dated Oct. 1, 2024, in European Application No. 21899342.6. (11 pages).

International Search Report and Written Opinion, dated Feb. 25, 2022, for International Application No. PCT/AU2021/051437. (10 pages).

International-type Search, dated Apr. 1, 2021, for Australian Provisional Application No. 2020904468. (15 pages).

* cited by examiner

Control Volume Analysis

| | Outlet Diameter Minimum | Outlet Diameter Maximum | Outlet Diameter Mean *Do* | Throat Diameter Minimum | Throat Diameter Maximum | Throat Diameter Mean *D* | Throat to Outlet Length *L* |
|---|---|---|---|---|---|---|---|
| #3 Blast Nozzle | 6.04 | 6.14 | 6.09 | 4.71 | 4.81 | 4.76 | 110 |
| #7 Blast Nozzle | 14.16 | 14.26 | 14.21 | 11.06 | 11.16 | 11.11 | 256.2 |
| #6 Blast Nozzle | 12.13 | 12.23 | 12.18 | 9.48 | 9.58 | 9.53 | 220 |
| #8 Blast Nozzle | 16.19 | 16.29 | 16.24 | 12.65 | 12.75 | 12.7 | 293.8 |

Fig. 11

| | Outlet Area | Throat Area | Outlet Area to Throat Area Ratio | Tan (Taper Angle) | Taper Angle (Radians) | Taper Angle (Degrees) | |
|---|---|---|---|---|---|---|---|
| #3 Blast Nozzle | 29.12893 | 17.79523743 | 1.63689446 | 0.006045455 | 0.006045381 | 0.346375 | 3.776315 |
| #7 Blast Nozzle | 158.5908 | 96.94334464 | 1.63591238 | 0.006049961 | 0.006049887 | 0.346633 | 1.615478 |
| #6 Blast Nozzle | 116.5157 | 71.33056806 | 1.63346102 | 0.006022727 | 0.006022654 | 0.345073 | 1.888158 |
| #8 Blast Nozzle | 207.139 | 126.6768698 | 1.63517639 | 0.006024506 | 0.006024434 | 0.345175 | 1.418371 |

Fig. 12

High Pressure Liner

Section D-D
Low Pressure Liner

No. 6 Silencer Universal
High Pressure Insert

No. 6 Silencer Universal Liner

No. 6 Silencer Universal
Low Pressure Insert

No. 6 Silencer Housing Universal

SILENCER FOR A BLAST NOZZLE

FIELD

The present disclosure relates to a silencing system for reducing sound levels that arise during pneumatic blasting.

BACKGROUND

Any references to methods, apparatus or documents of the prior art are not to be taken as constituting any evidence or admission that they formed, or form, part of the common general knowledge.

It is known to provide a blasting apparatus in which particles of abrasive material entrained in a stream of pressurised gas, most usually air, are expelled from a nozzle in a high velocity jet of the air that is directed onto a surface in order that the particles forcibly impact the surface to clean and/or abrade the surface.

One historically used abrasive material is sand, and when sand is used the blasting process may be referred to as sand blasting. However, other abrasive materials may be used, and garnet is often preferred to silica sand.

The nozzle used as part of the blasting apparatus comprises a body of hardwearing material through which a conduit for the stream of pressurised gas is formed. Commonly, the conduit is shaped so that the nozzles are comprised of a converging inlet portion, which includes an inlet opening for coupling to a source of the pressurised gas such as a blast pot. The inlet portion converges to a throat from which an outlet portion of the conduit extends to a nozzle outlet. The convergence of the inlet portion to the throat raises the velocity of the pressurised gas to approximately sonic speeds. The outlet portion may be formed to diverge from the throat to the nozzle outlet in order to further increase the velocity of the air so that the jet that is emitted from the nozzle outlet is at a high velocity.

FIG. 1 depicts a conventional blasting nozzle 1 in use. The blasting nozzle 1 is coupled by a connector 3 to a hose 5 through which high-pressure air 6 containing abrasive particles is passed to an inlet 7 of the nozzle 1 from a blast pot 2. The nozzle 1 is formed with an internal, longitudinal conduit 9 that includes an inlet portion 10 which converges from an inlet 7 to an axially extending throat 12, from which a diverging outlet portion 14 extends to nozzle outlet 11. The conduit 9 is thus shaped to accelerate the air so that the air is emitted from the nozzle outlet 11 in a high velocity jet 13 that is directed against a surface 15 of a workpiece 17 that is cleaned and abraded by the abrasive particles in the jet 13.

Due to the high-pressure and air flows used in abrasive blasting, typically high levels of noise are generated by blast nozzles such as nozzle 1. Typically blast nozzles can produce noise levels in excess of 100 dB. This proves problematic in a work environment where high levels of noise can be dangerous for workers and cause hearing damage due to extended exposure at these levels. Also, this can generate undesired noise problems for others outside the direct blast area.

To address the problem of excessive noise it is known to provide silencing devices or “silencers” which are tubular apparatus that connect to the outlet end of the nozzle and act to reduce the noise impact on the environment surrounding the blast nozzle.

Blast nozzles such as that of FIG. 1 are generally designed to accelerate particles in the gas 6 through the diverging outlet portion 14 to reach a maximum velocity at the nozzle outlet 11. In contrast, recently the present Applicant has developed a new nozzle geometry which is the subject of international patent application No. PCT/AU2021/050827, the content of which is hereby incorporated herein in its entirety by reference, and which operates in an ideally expanded mode so that the gas exiting the nozzle is at substantially ambient pressure.

Nozzles according to embodiments described in international patent application No. PCT/AU2021/050827 may have an outlet to throat area ratio of about 1.63 in order to deliver an ideal expansion ratio at the selected design pressure of 100 psi, with consideration for viscous flow.

Nozzles according to embodiments described in international patent application No. PCT/AU2021/050827 have been found to have significantly improved performance characteristics over those of the prior art nozzles, such as that of FIG. 1, because they are able to effectively prolong the integrity of the jet leaving the nozzle outlet to thereby increase the energy of the particles entrained in the jet as those particles travel between the outlet and the workpiece.

It is an object of the present invention to provide method and apparatus for reducing the operational noise of a blast nozzle.

SUMMARY

According to an aspect of the present invention there is provided a noise suppressed blasting system comprising:

- a source of blasting gas in a predetermined pressure range with abrasive particles entrained therein;
- a nozzle including
  - a nozzle inlet for connection to the source of blasting gas,
  - a nozzle outlet for emission of the blasting gas,
  - a nozzle conduit from the nozzle inlet to the nozzle outlet including a throat therebetween with a ratio of area of the nozzle outlet to area of the throat selected to emit the blasting gas from the nozzle outlet to produce a supersonic jet;
- a silencer connectable to the nozzle, to receive the supersonic jet exiting the nozzle, the silencer comprising a body with a silencer conduit therethrough, the body being of sufficient length and diameter to cause a flow condition of the jet received from the nozzle outlet to be modified such that 1½ shock cells are created in a jet inside the silencer, no shock cells are created in the jet outside the silencer and a jet exits the silencer in the form of a core jet with an established turbulent shear layer thereabout and entraining an annular jet located around the core jet.

In an embodiment the silencer body includes a coupling portion arranged to connect to a portion of the nozzle adjacent the nozzle outlet and a sound suppression portion defining the silencer conduit, wherein the sound suppression portion extends from the coupling portion to a silencer outlet of the silencer.

In an embodiment wherein the predetermined pressure range is 80 psi or greater.

In an embodiment the nozzle has a nozzle exit area to nozzle throat area ratio (A/A*) of 1.63±5%.

In an embodiment the nozzle comprises a #3 nozzle and the silencer has a silencer outlet diameter of 11.75±2.5% mm and a sound suppression portion length of 37.50±5% mm In an embodiment the nozzle comprises a #4 nozzle and the silencer has a silencer outlet diameter of 15.67±2.5% mm and a sound suppression portion length of 50.00±5% mm.

In an embodiment the nozzle comprises a #5 nozzle and the silencer has a silencer outlet diameter of 19.58±2.5% mm and a sound suppression portion length of 62.50±5% mm.

In an embodiment the nozzle comprises a #6 nozzle and the silencer has a silencer outlet diameter of 23.50±2.5% mm and a sound suppression portion length of 75.00±5% mm.

In an embodiment the nozzle comprises a #7 nozzle and the silencer has a silencer outlet diameter of 27.1±2.5% mm and a sound suppression portion length of 87.50±5% mm.

In an embodiment the nozzle comprises a #8 and the silencer has a silencer outlet diameter of 31.33±2.5% mm and a sound suppression portion length of 100±5% mm.

In an embodiment the nozzle comprises a #10 nozzle and the silencer has a silencer outlet diameter of 39.16±2.5% mm and a sound suppression portion length of 125±5% mm.

In an embodiment the nozzle comprises a nozzle with nozzle size as set out in the leftmost column of the following table and the silencer has a silencer outlet diameter as set out in the following table for the nozzle size and sound suppression portion length at least as long as set out in the following table for the nozzle size:

| Nozzle Size | Sound Suppression Portion Length (mm) | Outlet Diameter (mm) |
|---|---|---|
| No. 3 | 67.5 | 13.5 |
| No. 4 | 90.0 | 18.0 |
| No. 5 | 112.5 | 22.5 |
| No. 6 | 135.0 | 27.1 |
| No. 7 | 157.5 | 31.5 |
| No. 8 | 179.5 | 36.0 |
| No. 10 | 224.5 | 45.0 |

In an embodiment wherein the nozzle comprises a nozzle with nozzle size as set out in the leftmost column of the following table and the silencer has a silencer outlet diameter as set out in the following table for the nozzle size and sound suppression portion length at least as long as set out in the following table for the nozzle size:

| Nozzle Size | Sound Suppression Portion Length (mm) | Outlet Diameter (mm) |
|---|---|---|
| No. 3 | 17.5 | 10.0 |
| No. 4 | 23.0 | 13.0 |
| No. 5 | 29.0 | 16.5 |
| No. 6 | 34.5 | 20.0 |
| No. 7 | 40.5 | 23.0 |
| No. 8 | 46.0 | 26.5 |
| No. 10 | 57.5 | 33.0 |

In an embodiment the nozzle has a nozzle exit area to nozzle throat area ratio (A/A*) of 1.42±5%.

In an embodiment the nozzle comprises a nozzle with a nozzle size as set out in the leftmost column of the following table and the silencer has a silencer outlet diameter as set out in the following table below for the nozzle size and sound suppression portion length at least as long as set out in the following table for the nozzle size:

| Nozzle Size | Outlet Diameter (mm) | Sound Suppression Portion Length (mm) |
|---|---|---|
| No. 3 | 10.95 | 18.0 |
| No. 4 | 14.60 | 24.0 |
| No. 5 | 18.26 | 30.0 |
| No. 6 | 21.91 | 36.0 |
| No. 7 | 25.56 | 42.0 |
| No. 8 | 29.21 | 48.0 |
| No. 10 | 36.51 | 60.0 |

In an embodiment the nozzle has a nozzle exit area to nozzle throat area ratio (A/A*) of 2.1±5%.

In an embodiment the nozzle comprises a nozzle with a nozzle size as set out in the leftmost column of the following table and the silencer has a silencer outlet diameter as set out in the following table for the nozzle size and sound suppression portion length at least as long as set out in the following table for the nozzle size:

| Nozzle Size | Outlet Diameter (mm) | Sound Suppression Portion Length (mm) |
|---|---|---|
| No. 3 | 13.32 | 78.5 |
| No. 4 | 17.76 | 104.5 |
| No. 5 | 22.20 | 130.5 |
| No. 6 | 26.64 | 157.0 |
| No. 7 | 31.08 | 183.0 |
| No. 8 | 35.52 | 209.0 |
| No. 10 | 44.40 | 261.0 |

In an embodiment the predetermined pressure range is 80 psi or greater and the nozzle has an A/A* area ratio of 1.63±5% wherein the nozzle comprises a nozzle with a nozzle size as set out in the leftmost column of the following table and the silencer has a silencer outlet diameter as set out in the following table for the nozzle size and sound suppression portion length ranging between the preferred length and the minimum length for effective silencing as set out in the following table for the nozzle size:

| Nozzle Size | Preferred Diameter (mm) | Preferred Length (mm) | Minimum Length for effective silencing (mm) |
|---|---|---|---|
| No. 3 | 11.8 | 37.5 | 23.5 |
| No. 4 | 15.7 | 50.0 | 31.0 |
| No. 5 | 19.6 | 62.5 | 39.0 |
| No. 6 | 23.5 | 75.0 | 46.5 |
| No. 7 | 27.4 | 87.5 | 54.5 |
| No. 8 | 31.3 | 100.0 | 62.0 |
| No. 10 | 39.2 | 125.0 | 77.5 |

In an embodiment the predetermined pressure range is 80 psi to 120 psi and the nozzle has an A/A* area ratio of 1.63±5% wherein the nozzle comprises a #3 nozzle and wherein the length of the silencer is between 7.5 mm and 67.5 mm and the diameter of the silencer is between 10.00 mm and 13.5 mm.

In an embodiment the predetermined pressure range is 80 psi to 120 psi and the nozzle has an A/A* area ratio of 1.63±5% wherein the nozzle comprises a #4 nozzle and wherein the length of the silencer is between 10.0 mm and 90 mm and the diameter of the silencer is between 13 mm and 18 mm.

In an embodiment the predetermined pressure range is 80 psi to 120 psi and the nozzle has an A/A* area ratio of 1.63±5% wherein the nozzle comprises a #5 nozzle and wherein the length of the silencer is between 12.5 mm and 112.5 mm and the diameter of the silencer is between 12.5 mm and 22.5 mm.

In an embodiment the predetermined pressure range is 80 psi to 120 psi and the nozzle has an A/A* area ratio of 1.63±5% wherein the nozzle comprises a #6 nozzle and wherein the length of the silencer is between 15 mm and 135.0 mm and the diameter of the silencer is between 20 mm and 27.1 mm.

In an embodiment the predetermined pressure range is 80 psi to 120 psi and the nozzle has an A/A* area ratio of 1.63±5% wherein the nozzle comprises a #7 nozzle and wherein the length of the silencer is between 17.5 mm and 157.5 mm and the diameter of the silencer is between 23 mm and 31.5 mm.

In an embodiment the predetermined pressure range is 80 psi to 120 psi and the nozzle has an A/A* area ratio of 1.63±5% wherein the nozzle comprises a #8 nozzle and wherein the length of the silencer is between 20.0 mm and 179.5 mm and the diameter of the silencer is between 26.5 mm and 36.0 mm.

In an embodiment the predetermined pressure range is 80 psi to 120 psi and the nozzle has an A/A* area ratio of 1.63±5% wherein the nozzle comprises a #10 nozzle and wherein the length of the silencer is between 25 mm and 224.5 mm and the diameter of the silencer is between 33.0 mm and 45.0 mm.

In an embodiment the nozzle has a nozzle exit area to nozzle throat area ratio (A/A*) of between 1.42 and 2.1 and wherein the nozzle comprises a #3 nozzle and the silencer has a silencer outlet diameter of between 10 mm and 13.6 mm and a minimum sound suppression portion length of between 7.5 mm and 78.5 mm.

In an embodiment the nozzle has a nozzle exit area to nozzle throat area ratio (A/A*) of between 1.42 and 2.1 and wherein the nozzle comprises a #4 nozzle and the silencer has a silencer outlet diameter of between 12.4 mm and 18.1 mm and a minimum sound suppression portion length of between 10 mm and 104 mm.

In an embodiment the nozzle has a nozzle exit area to nozzle throat area ratio (A/A*) of between 1.42 and 2.1 and wherein the nozzle comprises a #5 nozzle and the silencer has a silencer outlet diameter of between 15.5 mm and 22.6 mm and a minimum sound suppression portion length of between 12.5 mm and 130.5 mm.

In an embodiment the nozzle has a nozzle exit area to nozzle throat area ratio (A/A*) of between 1.42 and 2.1 and wherein the nozzle comprises a #6 nozzle and the silencer has a silencer outlet diameter of between 18.5 mm and 27.1 mm and a minimum sound suppression portion length of between 15 mm and 157 mm.

In an embodiment the nozzle has a nozzle exit area to nozzle throat area ratio (A/A*) of between 1.42 and 2.1 and wherein the nozzle comprises a #7 nozzle and the silencer has a silencer outlet diameter of between 21.7 mm and 31.6 mm and a minimum sound suppression portion length of between 17.5 mm and 183 mm.

In an embodiment the nozzle has a nozzle exit area to nozzle throat area ratio (A/A*) of between 1.42 and 2.1 and wherein the nozzle comprises a #8 nozzle and the silencer has a silencer outlet diameter of between 24.8 mm and 36.1 mm and a minimum sound suppression portion length of between 20 mm and 209 mm.

In an embodiment the nozzle has a nozzle exit area to nozzle throat area ratio (A/A*) of between 1.42 and 2.1 and wherein the nozzle comprises a #10 nozzle and the silencer has a silencer outlet diameter of between 31.0 mm and 45.2 mm and a minimum sound suppression portion length of between 25 mm and 261 mm.

In an embodiment the coupling portion comprises a female thread.

In an embodiment the silencer body includes an inlet body portion that is removably received within the silencer conduit of the silencer body.

In an embodiment the inlet body portion comprises a removable sleeve that is removably received within the body.

According to further aspect there is provided a method for supressing noise during abrasive blasting, the method comprising:

- providing a blast nozzle including a nozzle body with a nozzle conduit extending from a nozzle inlet to a nozzle outlet with a throat of the conduit therebetween, a ratio of outlet area to throat area constraining the nozzle to produce a supersonic jet;
- connecting a source of blasting gas sufficient to produce a supersonic jet at the nozzle outlet; and
- coupling a silencer to an outlet end of the nozzle,
  - the silencer comprising a body with a silencer conduit therethrough, the body being of sufficient length and diameter to cause a flow condition of the jet received from the nozzle outlet to be modified such that 1½ shock cells are created in a jet inside the silencer, no shock cells are created in the jet outside the silencer and a jet exits the silencer in the form of a core jet with an established turbulent shear layer thereabout and entraining an annular jet located around the core jet.

In an embodiment the silencer body includes a coupling portion arranged to connect to a portion of the nozzle adjacent the nozzle outlet and a sound suppression portion defining the silencer conduit, wherein the sound suppression portion extends from the coupling portion to a silencer outlet of the silencer.

In an embodiment the predetermined pressure range is 80 psi or greater.

In an embodiment the nozzle has a nozzle exit area to nozzle throat area ratio (A/A*) of 1.63±5%.

In an embodiment the nozzle comprises a #3 nozzle and the silencer has a silencer outlet diameter of 11.75±2.5% mm and a sound suppression portion length of 37.50±5% mm.

In an embodiment the nozzle comprises a #4 nozzle and the silencer has a silencer outlet diameter of 15.67±2.5% mm and a sound suppression portion length of 50.00±5% mm.

In an embodiment the nozzle comprises a #5 nozzle and the silencer has a silencer outlet diameter of 19.58±2.5% mm and a sound suppression portion length of 62.50±5% mm.

In an embodiment the nozzle comprises a #6 nozzle and the silencer has a silencer outlet diameter of 23.50±2.5% mm and a sound suppression portion length of 75.00±5% mm.

In an embodiment the nozzle comprises a #7 nozzle and the silencer has a silencer outlet diameter of 27.1±2.5% mm and a sound suppression portion length of 87.50±5% mm.

In an embodiment the nozzle comprises a #8 and the silencer has a silencer outlet diameter of 31.33±2.5% mm and a sound suppression portion length of 100±5% mm.

In an embodiment the nozzle comprises a #10 nozzle and the silencer has a silencer outlet diameter of 39.16±2.5% mm and a sound suppression portion length of 125±5% mm.

In an embodiment the nozzle comprises a nozzle with nozzle size as set out in the leftmost column of the following table and the silencer has a silencer outlet diameter as set out in the following table for the nozzle size and sound suppression portion length at least as long as set out in the following table for the nozzle size:

| Nozzle Size | Sound Suppression Portion Length (mm) | Outlet Diameter (mm) |
|---|---|---|
| No. 3 | 67.5 | 13.5 |
| No. 4 | 90.0 | 18.0 |
| No. 5 | 112.5 | 22.5 |
| No. 6 | 135.0 | 27.1 |
| No. 7 | 157.5 | 31.5 |
| No. 8 | 179.5 | 36.0 |
| No. 10 | 224.5 | 45.0 |

In an embodiment the nozzle comprises a nozzle with nozzle size as set out in the leftmost column of the following table and the silencer has a silencer outlet diameter as set out in the following table for the nozzle size and sound suppression portion length at least as long as set out in the following table for the nozzle size:

| Nozzle Size | Sound Suppression Portion Length (mm) | Outlet Diameter (mm) |
|---|---|---|
| No. 3 | 17.5 | 10.0 |
| No. 4 | 23.0 | 13.0 |
| No. 5 | 29.0 | 16.5 |
| No. 6 | 34.5 | 20.0 |
| No. 7 | 40.5 | 23.0 |
| No. 8 | 46.0 | 26.5 |
| No. 10 | 57.5 | 33.0 |

In an embodiment the nozzle has a nozzle exit area to nozzle throat area ratio (A/A*) of 1.42±5%.

In an embodiment the nozzle comprises a nozzle with a nozzle size as set out in the leftmost column of the following table and the silencer has a silencer outlet diameter as set out in the following table for the nozzle size and sound suppression portion length at least as long as set out in the following table for the nozzle size:

| Nozzle Size | Outlet Diameter (mm) | Sound Suppression Portion Length (mm) |
|---|---|---|
| No. 3 | 10.95 | 18.0 |
| No. 4 | 14.60 | 24.0 |
| No. 5 | 18.26 | 30.0 |
| No. 6 | 21.91 | 36.0 |
| No. 7 | 25.56 | 42.0 |
| No. 8 | 29.21 | 48.0 |
| No. 10 | 36.51 | 60.0 |

In an embodiment wherein the nozzle has a nozzle exit area to nozzle throat area ratio (A/A*) of 2.1±5%.

In an embodiment wherein the nozzle comprises a nozzle with a nozzle size as set out in the leftmost column of the following table and the silencer has a silencer outlet diameter as set out in the following table for the nozzle size and sound suppression portion length at least as long as set out in the following table for the nozzle size:

| Nozzle Size | Outlet Diameter (mm) | Sound Suppression Portion Length (mm) |
|---|---|---|
| No. 3 | 13.32 | 78.5 |
| No. 4 | 17.76 | 104.5 |
| No. 5 | 22.20 | 130.5 |
| No. 6 | 26.64 | 157.0 |
| No. 7 | 31.08 | 183.0 |
| No. 8 | 35.52 | 209.0 |
| No. 10 | 44.40 | 261.0 |

In an embodiment the predetermined pressure range is 80 psi or greater and the nozzle has an A/A* area ratio of 1.63±5% wherein the nozzle comprises a nozzle with a nozzle size as set out in the leftmost column of the following table and the silencer has a silencer outlet diameter as set out in the following table for the nozzle size and sound suppression portion length ranging between the preferred length and the minimum length for effective silencing as set out in the following table for the nozzle size:

| Nozzle Size | Preferred Diameter (mm) | Preferred Length (mm) | Minimum Length for effective silencing (mm) |
|---|---|---|---|
| No. 3 | 11.8 | 37.5 | 23.5 |
| No. 4 | 15.7 | 50.0 | 31.0 |
| No. 5 | 19.6 | 62.5 | 39.0 |
| No. 6 | 23.5 | 75.0 | 46.5 |
| No. 7 | 27.4 | 87.5 | 54.5 |
| No. 8 | 31.3 | 100.0 | 62.0 |
| No. 10 | 39.2 | 125.0 | 77.5 |

In an embodiment the predetermined pressure range is 80 psi to 120 psi and the nozzle has an A/A* area ratio of 1.63±5% wherein the nozzle comprises a #3 nozzle and wherein the length of the silencer is between 7.5 mm and 67.5 mm and the diameter of the silencer is between and 13.5 mm.

In an embodiment the predetermined pressure range is 80 psi to 120 psi and the nozzle has an A/A* area ratio of 1.63±5% wherein the nozzle comprises a #4 nozzle and wherein the length of the silencer is between 10.0 mm and 90 mm and the diameter of the silencer is between 13 mm and 18 mm.

In an embodiment the predetermined pressure range is 80 psi to 120 psi and the nozzle has an A/A* area ratio of 1.63±5% wherein the nozzle comprises a #5 nozzle and wherein the length of the silencer is between 12.5 mm and 112.5 mm and the diameter of the silencer is between 12.5 mm and 22.5 mm.

In an embodiment the predetermined pressure range is 80 psi to 120 psi and the nozzle has an A/A* area ratio of 1.63±5% wherein the nozzle comprises a #6 nozzle and wherein the length of the silencer is between 15 mm and 135.0 mm and the diameter of the silencer is between and 27.1 mm.

In an embodiment the predetermined pressure range is 80 psi to 120 psi and the nozzle has an A/A* area ratio of 1.63±5% wherein the nozzle comprises a #7 nozzle and wherein the length of the silencer is between 17.5 mm and 157.5 mm and the diameter of the silencer is between 23 mm and 31.5 mm.

In an embodiment the predetermined pressure range is 80 psi to 120 psi and the nozzle has an A/A* area ratio of 1.63±5% wherein the nozzle comprises a #8 nozzle and wherein the length of the silencer is between 20.0 mm and 179.5 mm and the diameter of the silencer is between 26.5 mm and 36.0 mm.

In an embodiment the predetermined pressure range is 80 psi to 120 psi and the nozzle has an A/A* area ratio of 1.63±5% wherein the nozzle comprises a #10 nozzle and wherein the length of the silencer is between 25 mm and 224.5 mm and the diameter of the silencer is between 33.0 mm and 45.0 mm.

In an embodiment the coupling portion comprises a female thread.

In an embodiment the silencer body includes an inlet body portion that is removably received within the silencer conduit of the silencer body.

In an embodiment the inlet body portion comprises a removable sleeve that is removably received within the body.

According to another aspect there is provided a silencer arranged to connect to and suppress operational noise of a blast nozzle, the blast nozzle comprising a body with a conduit therethrough extending from a nozzle inlet for connection to a source of blasting gas and a nozzle outlet for emitting a jet, the nozzle conduit including a throat between the nozzle inlet and the nozzle outlet, the nozzle outlet having a nozzle outlet area and the throat having a throat area, a ratio of the nozzle outlet area to the throat area constraining the nozzle to produce a supersonic jet, the silencer comprising a body with a silencer conduit therethrough, the body being of sufficient length and diameter to cause a flow condition of the jet received from the nozzle outlet to be modified such that 1½ shock cells are created in a jet inside the silencer, no shock cells are created in the jet outside the silencer and a jet exits the silencer in the form of a core jet with an established turbulent shear layer thereabout and entraining an annular jet located around the core jet.

In an embodiment the silencer body includes a coupling portion arranged to connect to a portion of the nozzle adjacent the nozzle outlet and a sound suppression portion defining the silencer conduit, wherein the sound suppression portion extends from the coupling portion to a silencer outlet of the silencer.

In an embodiment the predetermined pressure range is 80 psi or greater.

In an embodiment the nozzle has a nozzle exit area to nozzle throat area ratio (A/A*) of 1.63±5%.

In an embodiment the nozzle comprises a #3 nozzle and the silencer has a silencer outlet diameter of 11.75±2.5% mm and a sound suppression portion length of 37.50±5% mm.

In an embodiment the nozzle comprises a #4 nozzle and the silencer has a silencer outlet diameter of 15.67±2.5% mm and a sound suppression portion length of 50.00±5% mm.

In an embodiment the nozzle comprises a #5 nozzle and the silencer has a silencer outlet diameter of 19.58±2.5% mm and a sound suppression portion length of 62.50±5% mm.

In an embodiment the nozzle comprises a #6 nozzle and the silencer has a silencer outlet diameter of 23.50±2.5% mm and a sound suppression portion length of 75.00±5% mm.

In an embodiment the nozzle comprises a #7 nozzle and the silencer has a silencer outlet diameter of 27.1±2.5% mm and a sound suppression portion length of 87.50±5% mm.

In an embodiment the nozzle comprises a #8 and the silencer has a silencer outlet diameter of 31.33±2.5% mm and a sound suppression portion length of 100±5% mm.

In an embodiment the nozzle comprises a #10 nozzle and the silencer has a silencer outlet diameter of 39.16±2.5% mm and a sound suppression portion length of 125±5% mm.

In an embodiment the nozzle comprises a nozzle with nozzle size as set out in the leftmost column of the following table and the silencer has a silencer outlet diameter as set out in the following table for the nozzle size and sound suppression portion length at least as long as set out in the following table for the nozzle size:

| Nozzle Size | Sound Suppression Portion Length (mm) | Outlet Diameter (mm) |
|---|---|---|
| No. 3 | 67.5 | 13.5 |
| No. 4 | 90.0 | 18.0 |
| No. 5 | 112.5 | 22.5 |
| No. 6 | 135.0 | 27.1 |
| No. 7 | 157.5 | 31.5 |
| No. 8 | 179.5 | 36.0 |
| No. 10 | 224.5 | 45.0 |

In an embodiment the nozzle comprises a nozzle with nozzle size as set out in the leftmost column of the following table and the silencer has a silencer outlet diameter as set out in the following table for the nozzle size and sound suppression portion length at least as long as set out in the following table for the nozzle size:

| Nozzle Size | Sound Suppression Portion Length (mm) | Outlet Diameter (mm) |
|---|---|---|
| No. 3 | 17.5 | 10.0 |
| No. 4 | 23.0 | 13.0 |
| No. 5 | 29.0 | 16.5 |
| No. 6 | 34.5 | 20.0 |
| No. 7 | 40.5 | 23.0 |
| No. 8 | 46.0 | 26.5 |
| No. 10 | 57.5 | 33.0 |

In an embodiment the nozzle has a nozzle exit area to nozzle throat area ratio (A/A*) of 1.42±5%.

In an embodiment the nozzle comprises a nozzle with a nozzle size as set out in the leftmost column of the following table and the silencer has a silencer outlet diameter as set out in the following table for the nozzle size and sound suppression portion length at least as long as set out in the following table for the nozzle size:

| Nozzle Size | Outlet Diameter (mm) | Sound Suppression Portion Length (mm) |
|---|---|---|
| No. 3 | 10.95 | 18.0 |
| No. 4 | 14.60 | 24.0 |
| No. 5 | 18.26 | 30.0 |
| No. 6 | 21.91 | 36.0 |
| No. 7 | 25.56 | 42.0 |
| No. 8 | 29.21 | 48.0 |
| No. 10 | 36.51 | 60.0 |

In an embodiment the nozzle has a nozzle exit area to nozzle throat area ratio (A/A*) of 2.1±5%.

In an embodiment the nozzle comprises a nozzle with a nozzle size as set out in the leftmost column of the following table and the silencer has a silencer outlet diameter as set out in the following table for the nozzle size and sound suppression portion length at least as long as set out in the following table for the nozzle size:

| Nozzle Size | Outlet Diameter (mm) | Sound Suppression Portion Length (mm) |
|---|---|---|
| No. 3 | 13.32 | 78.5 |
| No. 4 | 17.76 | 104.5 |
| No. 5 | 22.20 | 130.5 |
| No. 6 | 26.64 | 157.0 |
| No. 7 | 31.08 | 183.0 |
| No. 8 | 35.52 | 209.0 |
| No. 10 | 44.40 | 261.0 |

In an embodiment the predetermined pressure range is 80 psi or greater and the nozzle has an A/A* area ratio of 1.63±5% wherein the nozzle comprises a nozzle with a nozzle size as set out in the leftmost column of the following table and the silencer has a silencer outlet diameter as set out in the following table for the nozzle size and sound suppression portion length ranging between the preferred length and the minimum length for effective silencing as set out in the following table for the nozzle size:

| Nozzle Size | Preferred Diameter (mm) | Preferred Length (mm) | Minimum Length for effective silencing (mm) |
|---|---|---|---|
| No. 3 | 11.8 | 37.5 | 23.5 |
| No. 4 | 15.7 | 50.0 | 31.0 |
| No. 5 | 19.6 | 62.5 | 39.0 |
| No. 6 | 23.5 | 75.0 | 46.5 |
| No. 7 | 27.4 | 87.5 | 54.5 |
| No. 8 | 31.3 | 100.0 | 62.0 |
| No. 10 | 39.2 | 125.0 | 77.5 |

In an embodiment the predetermined pressure range is 80 psi to 120 psi and the nozzle has an A/A* area ratio of 1.63±5% wherein the nozzle comprises a #3 nozzle and wherein the length of the silencer is between 7.5 mm and 67.5 mm and the diameter of the silencer is between and 13.5 mm.

In an embodiment the predetermined pressure range is 80 psi to 120 psi and the nozzle has an A/A* area ratio of 1.63±5% wherein the nozzle comprises a #4 nozzle and wherein the length of the silencer is between 10.0 mm and 90 mm and the diameter of the silencer is between 13 mm and 18 mm.

In an embodiment the predetermined pressure range is 80 psi to 120 psi and the nozzle has an A/A* area ratio of 1.63±5% wherein the nozzle comprises a #5 nozzle and wherein the length of the silencer is between 12.5 mm and 112.5 mm and the diameter of the silencer is between 12.5 mm and 22.5 mm.

In an embodiment the predetermined pressure range is 80 psi to 120 psi and the nozzle has an A/A* area ratio of 1.63±5% wherein the nozzle comprises a #6 nozzle and wherein the length of the silencer is between 15 mm and 135.0 mm and the diameter of the silencer is between and 27.1 mm.

In an embodiment the predetermined pressure range is 80 psi to 120 psi and the nozzle has an A/A* area ratio of 1.63±5% wherein the nozzle comprises a #7 nozzle and wherein the length of the silencer is between 17.5 mm and 157.5 mm and the diameter of the silencer is between 23 mm and 31.5 mm.

In an embodiment the predetermined pressure range is 80 psi to 120 psi and the nozzle has an A/A* area ratio of 1.63±5% wherein the nozzle comprises a #8 nozzle and wherein the length of the silencer is between 20.0 mm and 179.5 mm and the diameter of the silencer is between 26.5 mm and 36.0 mm.

In an embodiment the predetermined pressure range is 80 psi to 120 psi and the nozzle has an A/A* area ratio of 1.63±5% wherein the nozzle comprises a #10 nozzle and wherein the length of the silencer is between 25 mm and 224.5 mm and the diameter of the silencer is between 33.0 mm and 45.0 mm.

In an embodiment the coupling portion comprises a female thread.

In an embodiment the silencer body includes an inlet body portion that is removably received within the silencer conduit of the silencer body.

In an embodiment the inlet body portion comprises a removable sleeve that is removably received within the body.

According to another aspect there is provided a silencer arranged to connect to and suppress operational noise of a blast nozzle, the blast nozzle comprising a body with a conduit therethrough extending from a nozzle inlet for connection to a source of blasting gas and a nozzle outlet for emitting a jet, the nozzle conduit including a throat between the nozzle inlet and the nozzle outlet, the nozzle outlet having a nozzle outlet area and the throat having a throat area, a ratio of the nozzle outlet area to the throat area constraining the nozzle to produce a supersonic jet, the silencer comprising a body formed of a housing with a liner conduit formed therethrough and one or more replaceable liners located in the liner conduit defining a silencer conduit extending from an inlet portion of the housing to an outlet of the housing.

In an embodiment the one or more liners comprise a single liner. The single liner may define an inlet portion of the liner conduit which diverges from the inlet portion of the body to a throat.

In an embodiment the one or more liners may comprise a first liner being a low-pressure inlet liner which defines an inlet portion of the silencer conduit that diverges from the inlet portion of the body to a throat.

In an embodiment the one or more liners may comprise a second liner being an outlet portion liner which defines an outlet portion of the silencer conduit in the form of a right cylinder.

In an embodiment the one or more liners may comprise a first liner being a high-pressure inlet liner which defines an inlet portion of the silencer conduit in the form of a right cylinder.

In an embodiment the one or more liners may include one or more inner liners and one or more outer liners wherein the outer liners are located coaxially about the inner liners.

In an embodiment the inner liners are made of a denser material than the outer liners for creating an acoustically reflective interface between the one or more inner liners and the one or more outer liners.

In an embodiment a lip is formed about the outlet of the housing for retaining the one or more liners.

In an embodiment the housing includes a coupling arrangement to attach to the nozzle.

In an embodiment a ratio of the nozzle outlet area to the throat area constrains the nozzle to produce a supersonic jet from the nozzle outlet at the selected inlet pressure.

A blast nozzle silencer for connection to a blast nozzle, including a body defining a conduit extending from an inlet of the silencer to an outlet of the silencer, the body being of a length for the conduit to extend a distance from an outlet of the blast nozzle sufficient to suppress and reduce acoustic emissions of a supersonic jet emitted from the blast nozzle outlet in use.

BRIEF DESCRIPTION OF THE DRAWINGS

Embodiments in accordance with the present disclosure will be described, by way of example, in the following Detailed Description of Embodiments which provides sufficient information for those skilled in the art to perform the invention. The Detailed Description of Embodiments is not to be regarded as limiting the scope of the preceding Summary section in any way. The Detailed Description will make reference to the accompanying drawings, by way of example, in which:

FIGS. 11 and 12 are tables presenting dimensions and ratios of a number of ideally expanded nozzles including the nozzle of FIGS. 2 to 5.

DETAILED DESCRIPTION OF EMBODIMENTS

Whilst the following discussion pertains to jets composed of gas, the inventors have observed nozzle flows for both gas only (for example, air), and particle laden flows (air containing abrasive particles), and noted similar flow structures with the aid of high speed optical imaging.

Blast nozzles are typically sized by their throat diameter in fractions of an inch, e.g. a #6 blast nozzle has a throat diameter of 6⁄16" whereas a #3 blast nozzle has a throat diameter of 3⁄16".

Figure 1:
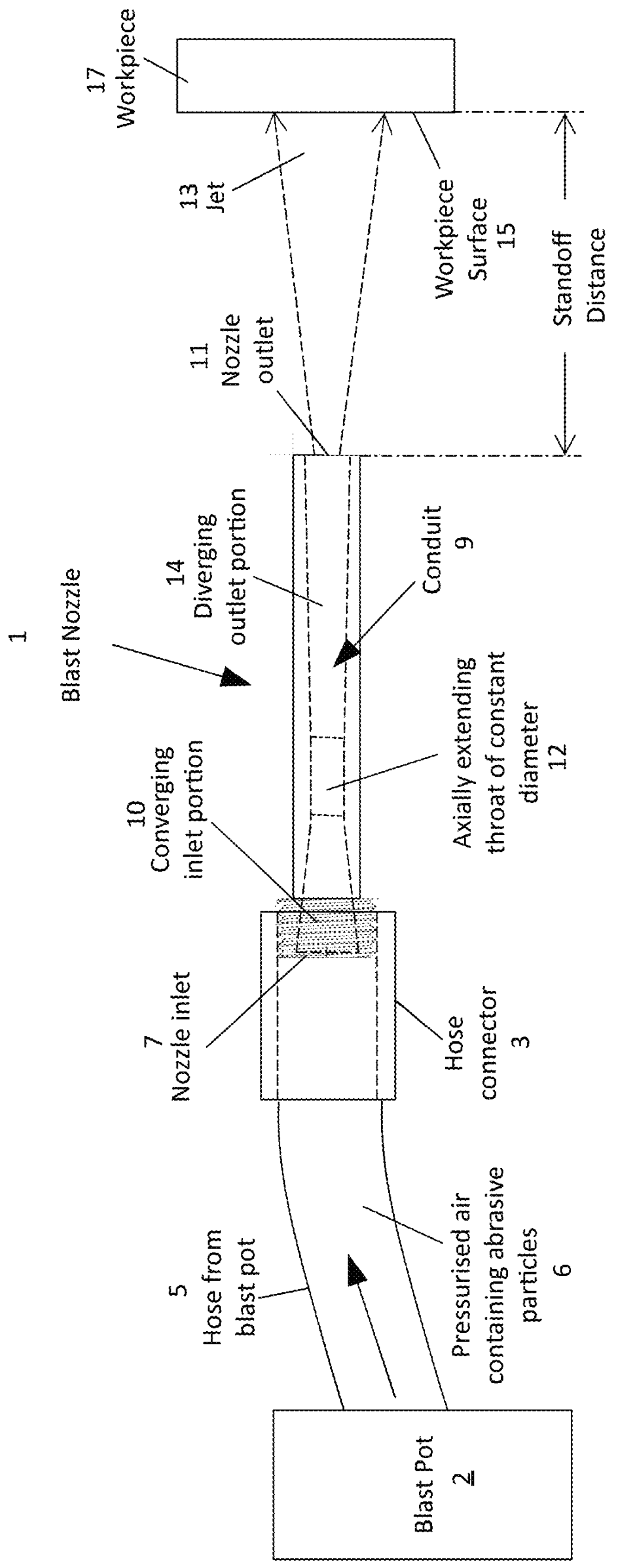
FIG. 1 depicts a prior art blast nozzle in use.
Figure 2:
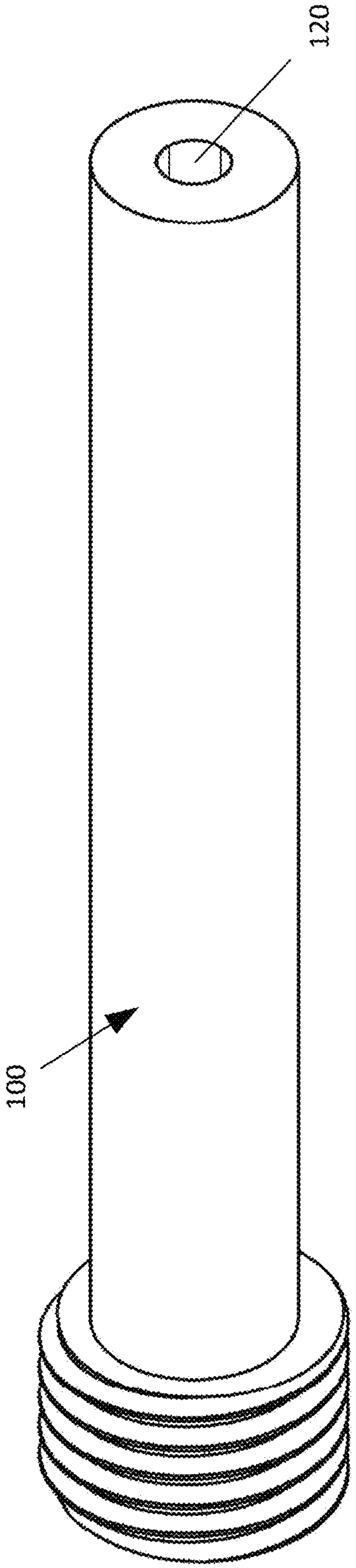
FIG. 2 is a view of blast nozzle for use with a silencer according to an embodiment of the present invention.
Figure 3:
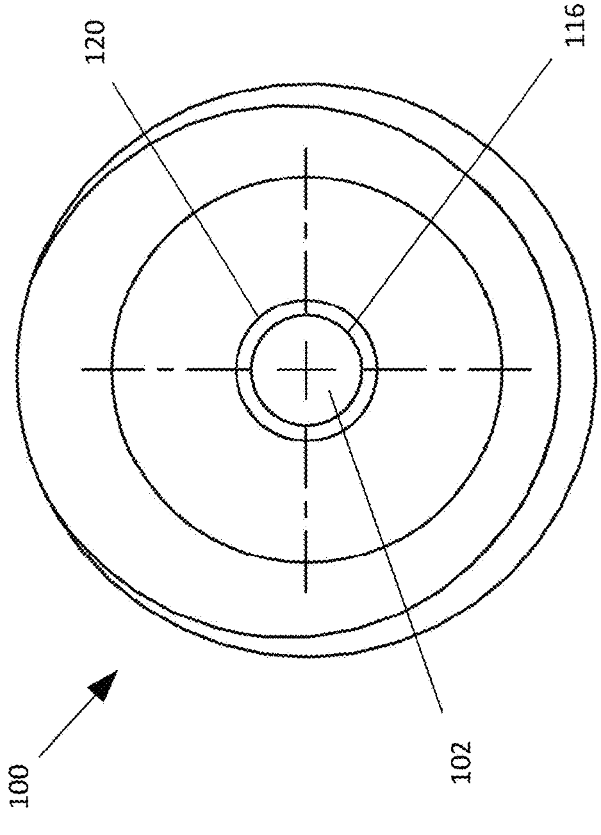
FIG. 3 is a view of a nozzle outlet end of the blast nozzle of FIG. 2.
Figure 4:
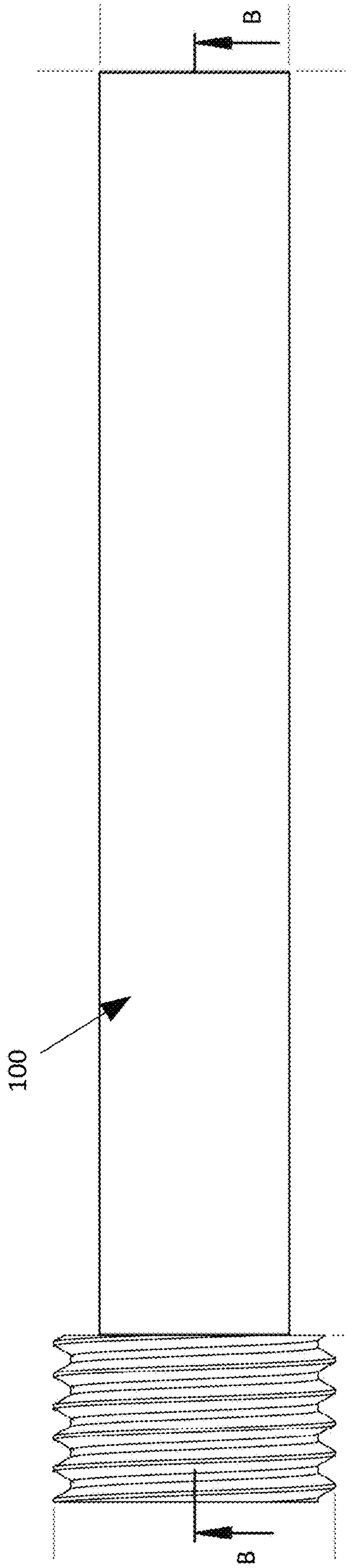
FIG. 4 is a side view of the nozzle of FIG. 2.
Figure 5:
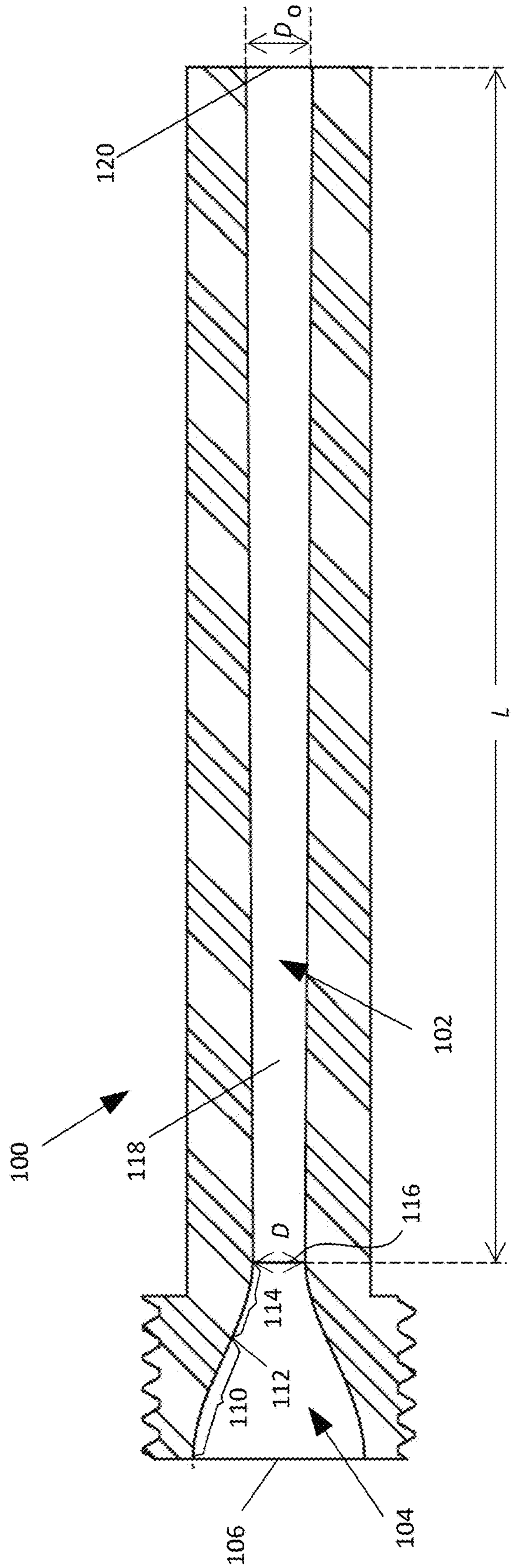
FIG. 5 is a longitudinal cross section of the nozzle of FIG. 3 along the line B-B of FIG. 4.

FIGS. 2 to 5 illustrate a 220 mm #6 nozzle 100 that is designed to produce a supersonic jet, and specifically for ideal expansion as discussed in the aforementioned international patent application No. PCT/AU2021/050827. FIG. 5 depicts a longitudinal cross section through the nozzle showing the conduit therethrough with the dimension L being a distance from throat 116 to nozzle outlet 120 of 200 mm.

The blast nozzle 100 is formed with a conduit 102 therethough for accelerating air with abrasive particles at a predetermined pressure. In the present case nozzle 100 is designed for an inlet air pressure of 80 to 120 psi and nominally 100 psi to discharge to sea level ambient atmospheric pressure at 27 degrees C. The pressurised air contains abrasive particles such as #80 Garnet to abrade a workpiece. The conduit 102 includes an inlet portion 104 that converges from an inlet opening 106, for receiving the compressed air, to a throat 116 for accelerating the air to a sonic speed. The inlet portion 104 may generally follow a concave-convex curve, as illustrated, with an initial concave portion 110 that proceeds through an inflection point 112 to a convex portion 114. The convex portion 114 ends in a throat 116, of zero axial length along the conduit, from which an outlet portion 118 extends. The outlet portion 118 diverges from the throat 116 to a nozzle outlet 120, for accelerating the air from the throat 116 to a super-sonic speed.

Figure 6:
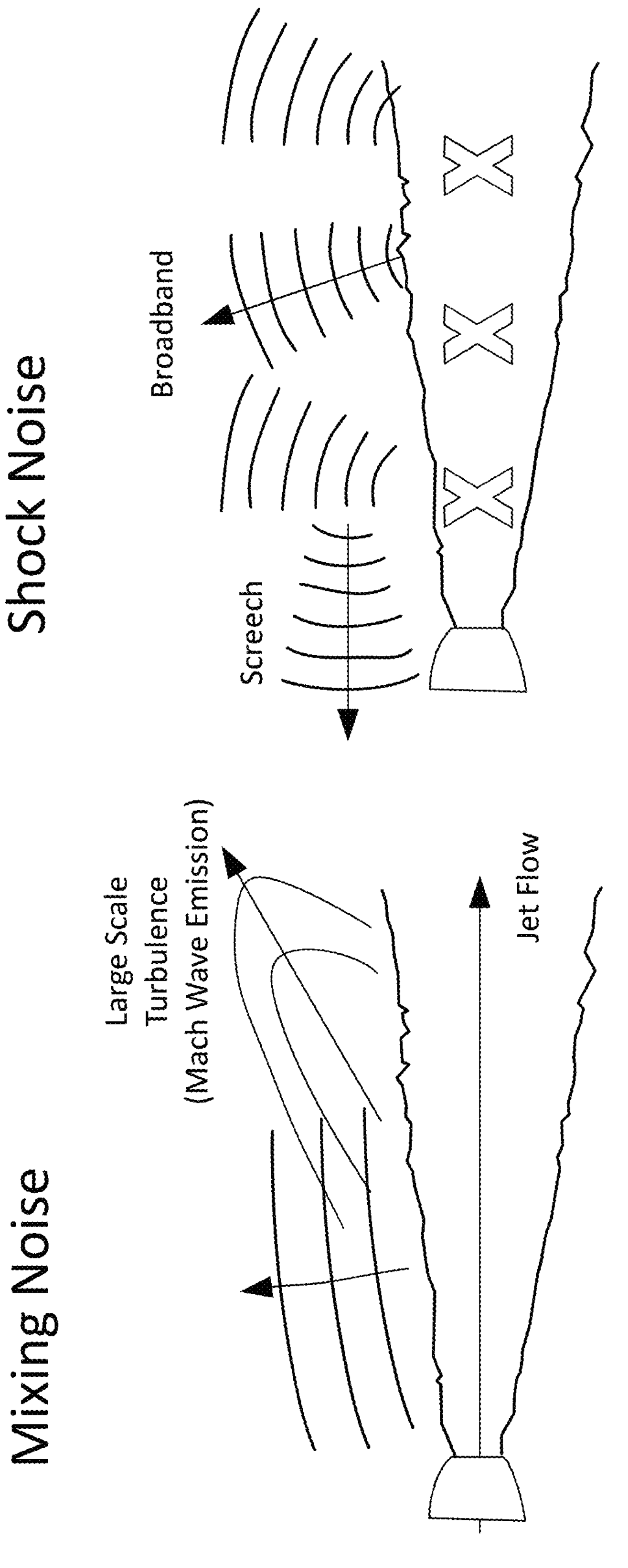
FIG. 6 is a diagram showing the directions in which mixing noises are emitted from a free jet and the directions in which shock noises are emitted from a free jet.

As illustrated in FIG. 6, blast nozzle noise is created as from several sources during the blasting process including:

1. Broadband shock noise created by the interaction of supersonic jet shock shear layer and surrounding ambient air.
2. Noise created by the interaction of the broadband shock noise and the nozzle lip causing screech tones.
3. Turbulent broadband mixing noise generated by the jet after it exits the nozzle.

It is known that an ideally expanded supersonic jet can be produced by a converging/expanding blast nozzle when operated at the design inlet pressure for the specific nozzle exit to nozzle throat area ratio (A/A*) such as the nozzle discussed in the international patent application No. PCT/AU2021/050827. Other blast nozzle geometries will produce an ideally expanded jet when operated at the ideal supply pressure for the particular nozzle exit to nozzle throat area ratio A/A*. Table 1 lists the exit Mach number, ideal pressure ratio and ideal supply pressure (P_design) pressure for a range of nozzle A/A* ratios.

Exit Mach number, ideal pressure ratio and ideal supply pressure for a range of nozzle A/A* ratios

| Area Ratio (Nozzle_ Exit/ Throat A/A*) | Exit Mach Number | Ideal Pressure Ratio (P_total/ P_ambient) | Ideal Supply Pressure (kPa) P_Design | Ideal Supply Pressure (psi) P_Design |
|---|---|---|---|---|
| 1.00 | 1 | 1.89 | 189.29 | 27.45 |
| 1.00 | 1.05 | 2.01 | 200.85 | 29.13 |
| 1.01 | 1.1 | 2.14 | 213.51 | 30.97 |
| 1.02 | 1.15 | 2.27 | 227.36 | 32.98 |
| 1.03 | 1.2 | 2.42 | 242.50 | 35.17 |
| 1.05 | 1.25 | 2.59 | 259.03 | 37.57 |
| 1.07 | 1.3 | 2.77 | 277.07 | 40.19 |
| 1.09 | 1.35 | 2.97 | 296.76 | 43.04 |
| 1.11 | 1.4 | 3.18 | 318.23 | 46.16 |
| 1.14 | 1.45 | 3.42 | 341.62 | 49.55 |
| 1.18 | 1.5 | 3.67 | 367.10 | 53.24 |
| 1.21 | 1.55 | 3.95 | 394.85 | 57.27 |
| 1.25 | 1.6 | 4.25 | 425.04 | 61.65 |
| 1.29 | 1.65 | 4.58 | 457.89 | 66.41 |
| 1.34 | 1.7 | 4.94 | 493.60 | 71.59 |
| 1.39 | 1.75 | 5.32 | 532.41 | 77.22 |
| 1.44 | 1.8 | 5.75 | 574.58 | 83.34 |
| 1.50 | 1.85 | 6.20 | 620.37 | 89.98 |
| 1.56 | 1.9 | 6.70 | 670.06 | 97.18 |
| 1.62 | 1.95 | 7.24 | 723.98 | 105.00 |
| 1.69 | 2 | 7.82 | 782.44 | 113.48 |
| 1.76 | 2.05 | 8.46 | 845.81 | 122.68 |
| 1.84 | 2.1 | 9.14 | 914.47 | 132.63 |
| 1.92 | 2.15 | 9.89 | 988.81 | 143.41 |
| 2.00 | 2.2 | 10.69 | 1069.27 | 155.08 |
| 2.10 | 2.25 | 11.56 | 1156.31 | 167.71 |
| 2.19 | 2.3 | 12.50 | 1250.43 | 181.36 |
| 2.30 | 2.35 | 13.52 | 1352.14 | 196.11 |
| 2.40 | 2.4 | 14.62 | 1462.00 | 212.05 |
| 2.52 | 2.45 | 15.81 | 1580.61 | 229.25 |
| 2.64 | 2.5 | 17.09 | 1708.59 | 247.81 |
| 2.76 | 2.55 | 18.47 | 1846.62 | 267.83 |
| 2.90 | 2.6 | 19.95 | 1995.40 | 289.41 |
| 3.04 | 2.65 | 21.56 | 2155.69 | 312.66 |
| 3.18 | 2.7 | 23.28 | 2328.29 | 337.69 |
| 3.34 | 2.75 | 25.14 | 2514.03 | 364.63 |
| 3.50 | 2.8 | 27.14 | 2713.83 | 393.61 |

-continued

Exit Mach number, ideal pressure ratio and ideal supply pressure for a range of nozzle A/A* ratios

| Area Ratio (Nozzle_ Exit/ Throat A/A*) | Exit Mach Number | Ideal Pressure Ratio (P_total/ P_ambient) | Ideal Supply Pressure (kPa) P_Design | Ideal Supply Pressure (psi) P_Design |
|---|---|---|---|---|
| 3.67 | 2.85 | 29.29 | 2928.62 | 424.76 |
| 3.85 | 2.9 | 31.59 | 3159.41 | 458.23 |
| 4.04 | 2.95 | 34.07 | 3407.25 | 494.18 |
| 4.23 | 3 | 36.73 | 3673.27 | 532.76 |

It is also known that nozzles as described, when operated at the ideal supply pressure, produce a supersonic jet that is substantially at ambient pressure when it exits the blast nozzle i.e., an ideally expanded jet, exhibit a train of recurring shock diamonds in the jet downstream of the nozzle exit, produce a jet stream that is less turbulent than if operated at an inlet pressure that is greater than or less than ideal supply pressure, ie at an inlet pressure that causes the jet exiting the blast nozzle to be overexpanded or under expanded.

Various symbols will be referred to herein as set out in Table 2 below.

List of symbols used herein
Nomenclature

| Symbol | Units | Description |
|---|---|---|
| $D_s$ | mm | Silencer internal diameter |
| $D_o$ | mm | Nozzle outlet diameter |
| $D_t$ | mm | Nozzle throat diameter |
| A | $m^2$ | Nozzle outlet area |
| A* | $m^2$ | Nozzle throat area |
| P_design | PSI | The pressure at which the nozzle will produce an ideally expanded jet to atmospheric pressure (guage) |
| P_total | PSI | Stagnation (or Total) pressure |
| P_ambient | PSI | Ambient pressure |
| P* | PSI | Pressure at which silencing become effective |
| M | — | Mach number |
| AR | — | Area ratio (A/A*) |

It is also known that when nozzle inlet pressure increases above the ideal supply pressure for the a given nozzle A/A* ratio, the supersonic jet that is produced will progressively become more underexpanded and when the nozzle inlet pressure decreases below the ideal supply pressure for the a given nozzle A/A* ratio, the supersonic jet that is produced will progressively become more overexpanded. Overexpanded and underexpanded supersonic jets are more turbulent than ideally expanded jets and the jet structure breaks down at a shorter distance after the nozzle exit compared to an ideally expanded jet.

The Inventors hypothesised that if the jet exiting the blast nozzle could be modified in such a way to reduce or eliminate the characteristics of the jet that produce noise during the blasting process, then effective blast nozzle silencing would occur.

As will be discussed, the Inventors found that useful silencing continues to occur for nozzles that are operated at above or below the design pressures (P_design), i.e., overexpanded or underexpanded unsilenced jets, but the effectiveness of silencing will be reduced and cease at a limiting minimum inlet pressure below the design pressures (P_design) for a given nozzle geometry. The limiting minimum pressure for reliable silencing to occur for a nozzle with an area ratio A/A* of 1.42 is 50 psi±5%, with an A/A* of 1.63 is 65 psi±5% and with an A/A* of 2.1 is 100 psi±5%. As inlet pressure increases and the jet becomes more underexpanded, effective silencing continues to occur up to the practical limitation for typical blasting systems—currently 150 psi.

It should be noted that stated silencer dimensions in the following are for operation at standard atmospheric conditions at sea level. Allowance should be made to accommodate differences in atmospheric pressure, temperature and humidity expected during operation.

Through CFD simulation, laboratory experiments and in-field testing, the inventors have discovered that noise generated by the blast nozzle during blasting can be reduced by attaching a silencer that receives and modifies a supersonic jet exiting the blast nozzle when operated within a range of nozzle inlet pressures.

The inventors have shown the effectiveness of a silencer is dependent on interactions between the jet and silencer.

Figure 7:
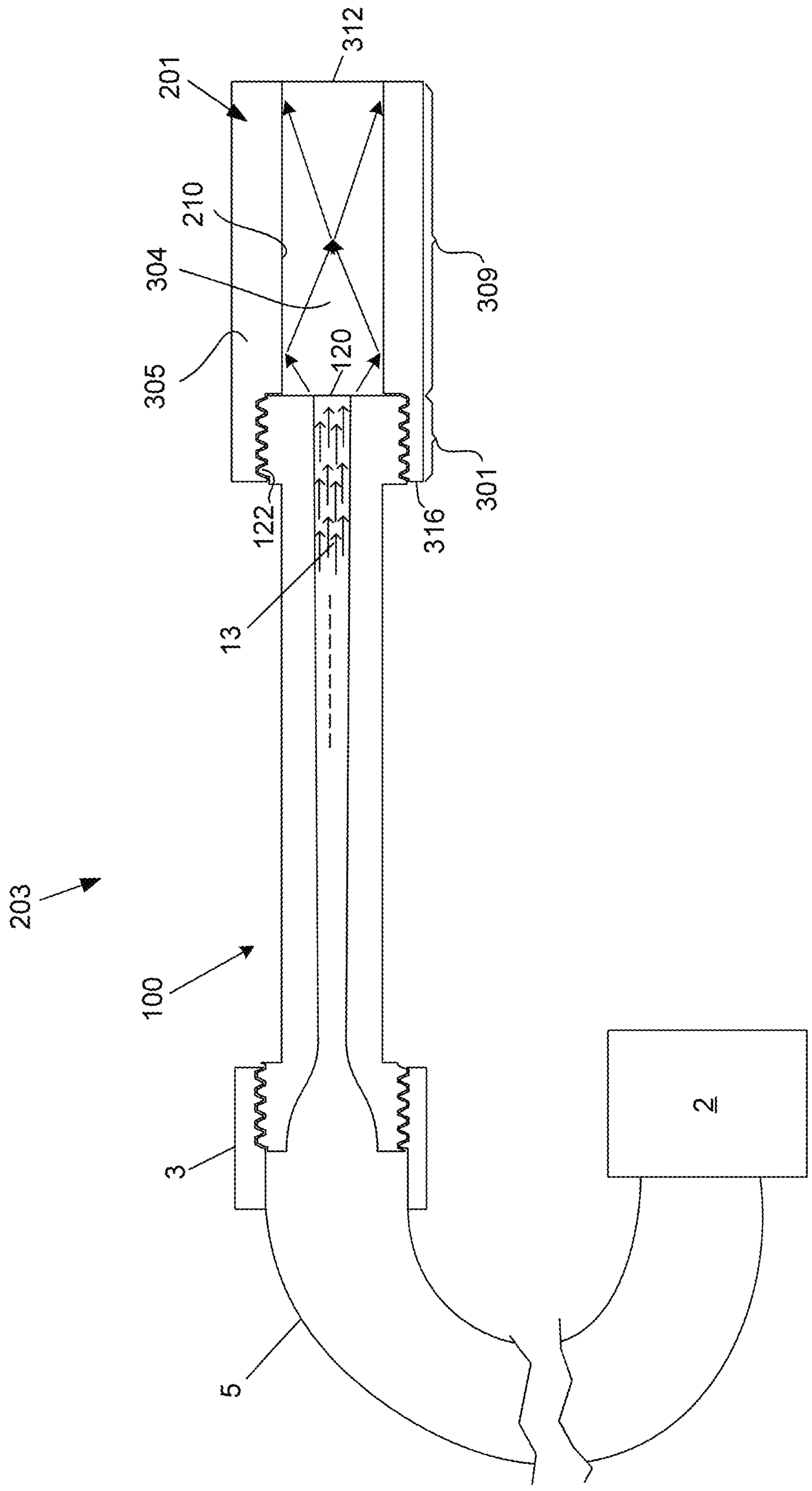
FIG. 7 is a first diagram of a blasting silencing system silencing system.

With reference to FIG. 7, a noise suppression system 203 is depicted wherein a silencer 201 is connected to blast nozzle 100, which in turn is coupled by a coupler 5 to a source of pressurised gas in the form of a blast pot 2. The silencer 201 is comprised of a body 305, preferably of a hardwearing material, that has a conduit 304 formed therethrough. A coupling portion 301 of the body 305 is provided which includes a female coupling thread 316 formed concentric with the silencer conduit 304 for mating with a complementary male thread 122 formed about an outlet end of the blast nozzle 100, adjacent nozzle outlet 120. It will be realised that other suitable fastening arrangements are possible, such as a bayonet type fastening arrangement.

Figure 8:
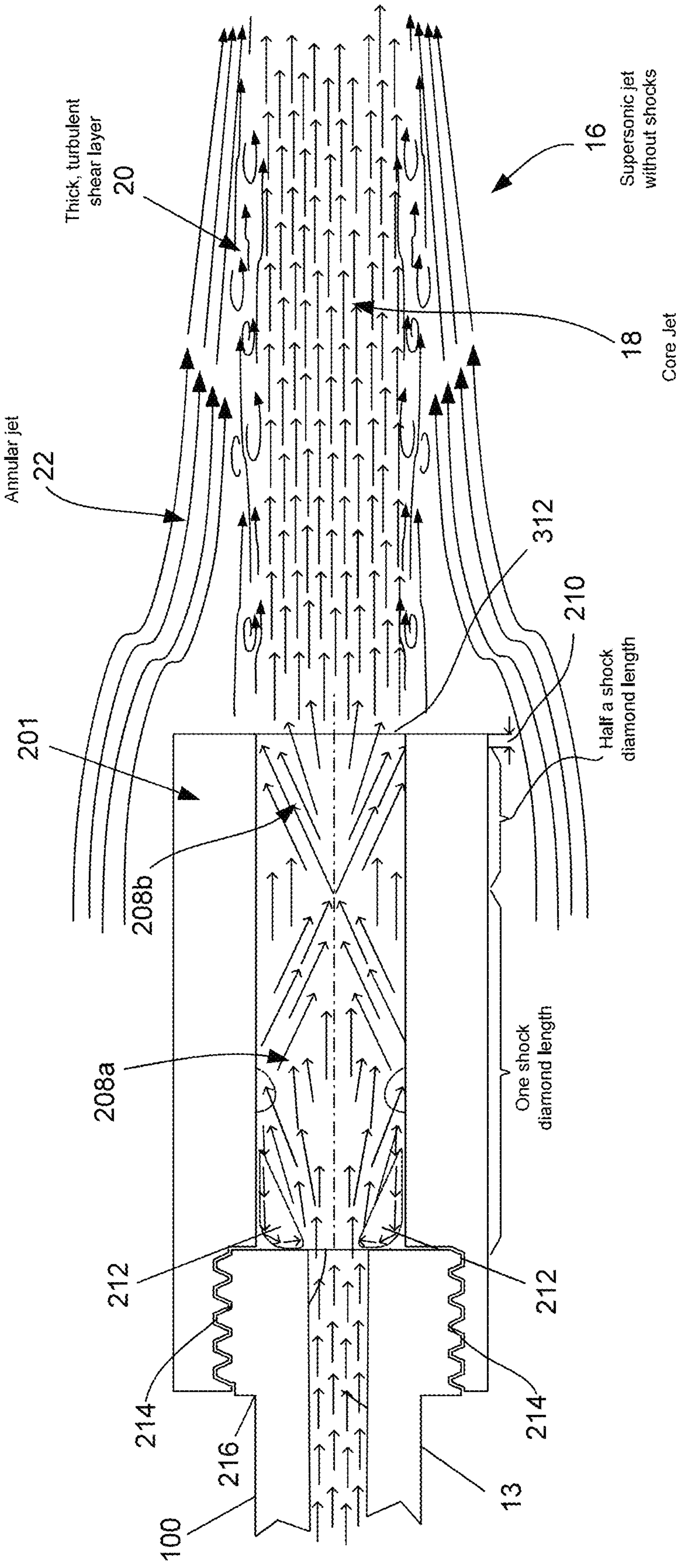
FIG. 8 is a diagram illustrating fluid flow from the silencing system of FIG. 7 in detail.
Figure 10:
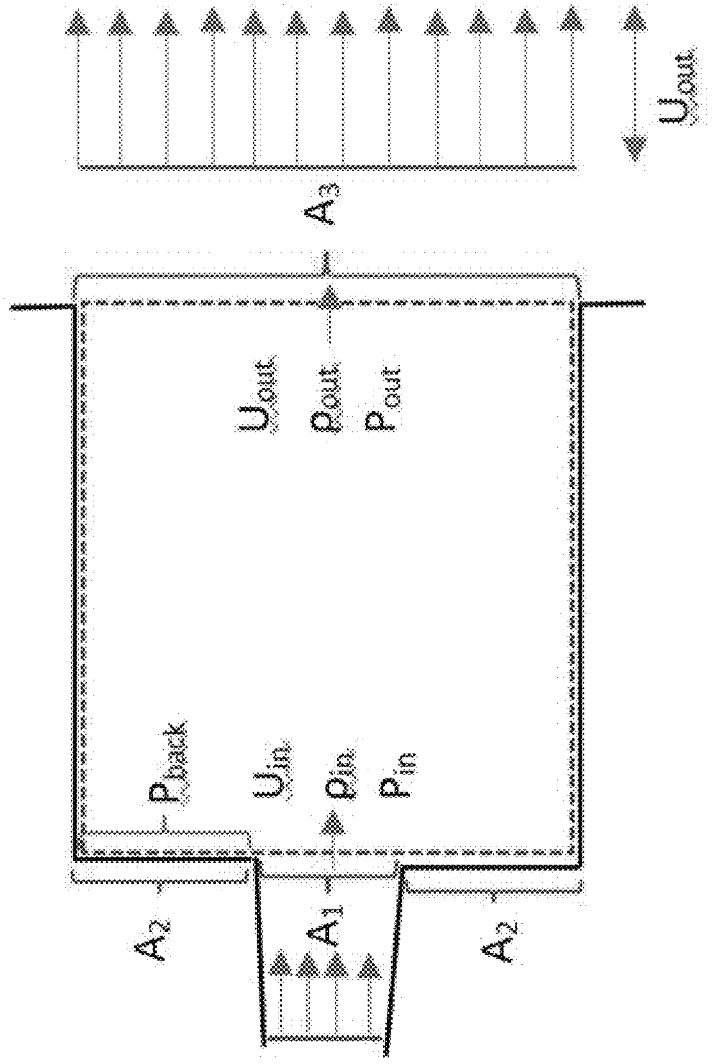
FIG. 10 is a control volume analysis diagram for a silencer.

Silencer 201 is effective because, as illustrated in FIG. 8, through interaction of the jet and silencer, an expansion of the jet occurs at the nozzle exit. The expansion creates a shock structure within the silencer. Typically the shock structure within the silencer is comprised of one full shock diamond 208*a* and one half shock diamond 208*b*. The one and a half shock diamonds 208*a*, 208*b* are created by the jet 13 that exits blast nozzle 100 interacting with the silencer walls and the resulting expansion necessitating a low-pressure region 212 on a shoulder 214 adjacent to the nozzle exit 216. The reasons for the formation of the low-pressure region 212 can be demonstrated through a momentum balance analysis applied to the silencer, shown in FIG. 10.

In the following analysis the symbols used refer to quantities as set out in Table 3 below:

Variables used in Momentum Analysis
Momentum Analysis Nomenclature

| Symbol | Units | Description |
|---|---|---|
| $U_{x\ in}$ | m/s | Velocity in axial direction at the inlet to the silencer |
| $\overline{U}_{x\ in}$ | m/s | Average velocity in axial direction at the inlet to the silencer |
| $U_{x\ out}$ | m/s | Velocity in axial direction at the outlet of the silencer |
| $\overline{U}_{x\ out}$ | m/s | Average velocity in axial direction at the outlet of the silencer |
| $A_1$ | $m^2$ | Cross-sectional area to the inlet of the silencer |
| $A_2$ | $m^2$ | Cross-sectional area of silencer step |
| $A_3$ | $m^2$ | Cross-sectional area of silencer outlet |
| $\overline{P}_{in}$ | Pa | Average static pressure acting on the cross-section of the inlet to silencer |
| $\overline{P}_{out}$ | Pa | Average static pressure acting on the cross-section of the outlet to silencer |
| $P_{atm}$ | Pa | Atmospheric pressure |
| $P_{in}$ | Pa | static pressure acting on the cross-section of the inlet to silencer |
| $P_{out}$ | Pa | static pressure acting on the cross-section of the outlet to silencer |
| $\dot{m}$ | kg/s | Mass flow rate through the silencer |
| $P_{back}$ | Pa | Static pressure acting on the silencer step area |
| $\rho_{in}$ | $kg/m^3$ | Density at the inlet |
| $\rho_{out}$ | $kg/m^3$ | Density at the outlet |
| $\overline{\rho}_{in}$ | $kg/m^3$ | Average density at the inlet |
| $\overline{\rho}_{out}$ | $kg/m^3$ | Average density at the outlet |
| $\lvert U_{x\ out}\rvert$ | m/s | Absolute value of the Average velocity in axial direction at the outlet to the silencer |

For the following analysis it is assumed that profiles of flow entering and exiting the silencer are uniform when the silencer is operational.

This means velocity and density and pressure are more or less constant across the various areas, i.e., $A_1$—inlet, $A_2$—backwards facing shoulder and $A_3$—outlet.

Balance of Momentum

Momentum fluxes are $$\int_{A_1} \rho_{in}|U_{xin}|U_{x\,in}dA + \int_{A_1} P_{in}dA + \int_{A_2} P_{back}dA - \int_{A_3} \rho_{out}|U_{x\,out}|U_{x\,out}dA - \int_{A_3} P_{out}dA = 0$$

Balance of Mass Flow Rate

Mass flow rate in;

$$\int_{A_1} \rho_{in} U_{x\,in} dA = \underbrace{\overline{\rho}_{in}\overline{U}_{x\,in}}_{\text{Is constant across}} A_1$$

Mass flow rate out;

$$\int_{A_3} \rho_{out} U_{x\,out} dA = \overline{\rho}_{out}\overline{U}_{x\,out}A_3$$

As mass flow rate is conserved.

$$\overline{\rho}_{in}\overline{U}_{x\,in}A_1 = \overline{\rho}_{out}\overline{U}_{x\,out}A_3 = \dot{m}$$

Momentum Balance Continued

Simplifying and using average values (flow states at boundaries are near constant);

$$\dot{m}\bar{U}_{x\,in}A_1 + \bar{P}_{in}A_1 + \bar{P}_{back}A_2 - \dot{m}\bar{U}_{x\,out}A_3 - \bar{P}_{out}A_3 = 0$$

And continuing to simplify;

$$\dot{m}\left(\bar{U}_{x\,in}A_1 - \bar{U}_{x\,out}A_3\right) = \bar{P}_{out}A_3 - \bar{P}_{in}A_1 - \bar{P}_{back}A_2$$

At ideally expanded conditions;

$P_{in} \approx P_{atm}$ and $\bar{P}_{out} = P_{atm}$

Also;

$$A_2 = A_3 - A_1$$

Hence;

$$\dot{m}\left(\bar{U}_{x\,in}A_1 - \bar{U}_{x\,out}A_3\right) = (P_{atm} - P_{back})A_2$$

Inspection of the above equation shows that if;

$$\bar{U}_{x\,in}A_1 - \bar{U}_{x\,out}A_3 > 0$$

Then;

$P_{atm} - P_{back} > 0$ or $P_{back} < P_{atm}$

Hence the design of the silencer generates an expansion from the control volume inlet to outlet that achieves:

$$\bar{U}_{x\,in}A_1 - \bar{U}_{x\,out}A_3 > 0$$

An important feature for silencer operation is that the 1½ shock diamonds, comprising a first shock diamond 208*a* and a half shock diamond 208*b* are created in the conduit of silencer 201 such that the half shock diamond 208*b* within the silencer is reflected within the silencer body by a small margin 210. The margin 210 is required to assure that the flow structure remains inside the silencer and intact in the presence of flow unsteadiness and other causes of variation.

Figure 9:
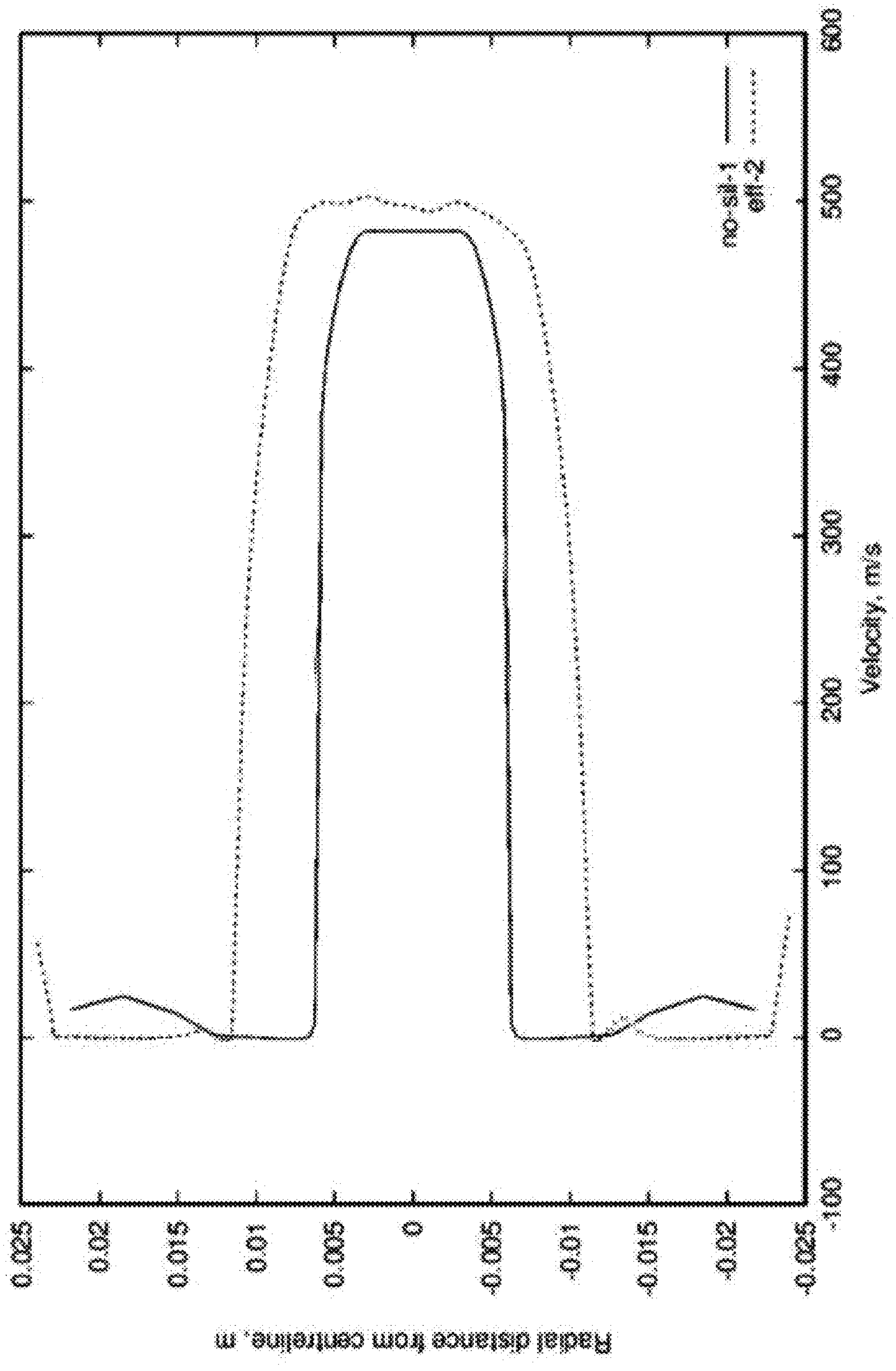
FIG. 9 is a graph comparing velocity profiles at silencer exit (eff-2) and nozzle exit for non-silenced case (no-sil-1).

At the silencer exit 312, compared to a non-silenced nozzle, the core jet 18 exiting the silencer 201 tends to have a similar velocity (still supersonic) to that of the flow exiting from nozzle 100 when unsilenced and provided with the same pressure of gas. However, the core jet 18 has a larger diameter. In addition, the core jet 18 is less clearly defined (i.e., there is a smooth round off of velocity versus a distinct edge), and the velocity gradient in the radial direction is less severe as shown in the graph of FIG. 9.

A further feature of the core jet 18 exiting the silencer 201 is that pressure has largely equalised to atmospheric and that large scale turbulent flow structures have formed around the perimeter of the core jet 18 when it exists the silencer. That is, a thick shear layer 20 is already present when the core jet 18 exits the silencer 201. In contrast a non-silenced jet a similar distance from the nozzle exit still has a relatively thin shear layer and a clearly defined jet boundary.

A non-effective silencer (too short and/or diameter too large) will continue to exhibit a series of shock diamonds similar to those of a non-silenced nozzle and the jet velocity profile will be largely similar to that of a non-silenced jet and the jet will continue to be noisy.

As mentioned beforehand the jet exiting the silencer has a similar air velocity as a non-silenced jet, but is wider, and exhibits large scale turbulent flow structures around the jet perimeter.

A key feature of the resulting core jet 18 is that for an effective silencer no shock diamonds form downstream of the silencer exit. It is hypothesised that this is due to the large-scale turbulent structures that form at the perimeter of the jet in conjunction with the equilibration of pressure difference that takes place inside the silencer. These large-scale flow structures prevent the formation of discontinuities—i.e., shocks. Thus, a supersonic jet without discontinuities (shocks) is created.

In essence the jet created at the silencer exit shares characteristics with an unsilenced supersonic jet further downstream, past the point of shear-layer breakdown and once the shock diamonds have dissipated.

A further feature of the effective silencer jet 16 is that it entrains more air from the surroundings. The underlying cause for this is the larger turbulent flow structures, e.g. turbulent shear layer 20, which are effective at exchanging momentum with the surroundings. Effectively, air from radially outwards of the silencer is entrained and forms a second slower annular jet 22 that sits around the core jet 18 exiting from silencer. Considering the #6 nozzle and silencer combination previously mentioned, this outer annular jet 22 and core jet 18 merge approximately ten silencer exit diameters downstream of the nozzle 100.

Under certain conditions, typically when the ideally sized nozzle and silencer are running at pressures below their design pressure (P_design) and approaching P*, it has been seen that the unsteady flow features can cause large scale instabilities of the jet 16. This is undesirable as it causes new noise.

As previously discussed with reference to FIG. 6, for a silencer to be effective, multiple causes of noise must be suppressed. Typically, these include Turbulent Mixing Noise, Screech-Tones and Broadband Shock Noise. A silencer addressing just one noise source will be beneficial, but for maximum noise reduction all causes need to be addressed.

The silencer described is effective as it achieves the following physical effects:

a) Shocks are only created inside the silencer. This eliminates the generation of shock noise outside of the silencer. Any shock noise generated inside the silencer will be directed along the jet or attenuated before being transmitted to the surroundings.

b) As the jet exits the silencer with an established turbulent layer 20, the process of shear-layer break down that takes place for a non-silenced supersonic jet is eliminated. Thus, the flow region that typically generates the screech tones and broadband shock noise is removed. In essence the jet exiting the silencer shares characteristics of a supersonic jet at a position downstream of where the shear-layer has broken down.

c) The jet entrains a lower speed annular jet 22 that sits around the outside of the core jet 18. The lower speed annular jet acts as an acoustic barrier around the core jet 18. The annular jet 22 and the turbulent shear layer 20 that forms outside of the core jet 18, act to attenuate the transmission of acoustic waves from the core jet 18. This assists in attenuating each of the previously discussed noises, i.e. Turbulent Mixing Noise, Screech-Tones, and Broadband Shock Noise.

Silencer Sizing

It has been found that a silencer with internal dimensions of diameter 23.5 mm and length of 45 mm or greater is effective for use with a #6 nozzle, designed to have an unsilenced ideally expanded flow at a supply pressure of 100 psi. Such a nozzle is discussed in the aforementioned international patent application No. PCT/AU2021/050827.

Other silencer dimensions work also. Typically, larger diameter silencers must be longer to remain effective and smaller diameter silencers can be shorter.

The silencer continues to operate when the nozzle is operated at different supply pressures. Ranges of good performance have been found to be +/−20 psi from the design pressure.

The silencer can be designed to operate at a wide range of operating pressures (e.g. at 80 or 100 psi) by altering the length and/or diameter. For example, the #6 silencer with a 23.5 mm ID to 75 mm (increased length), has good performance from 80 to >120 psi.

To maximise performance (maximum silencing and cleaning rate) at different operating pressures it is necessary to adjust the dimensions of the silencer. That is, while a silencer designed for 100 psi (nominal design point) will still provide silencing at 80 psi, to achieve maximum performance the silencer dimensions should be adjusted (shorter and smaller diameter).

Silencer geometries for effective silencing are set out in Table 4 to Table 13 for nozzles with an area ratio of 1.63±5%. The tables show examples of preferred silencer lengths and diameters and minimum lengths for effective silencing for a range of pressures at which silencing becomes effective (P*). Table 4 shows, for each nozzle size a preferred diameter, and preferred length when operated at 100 psi and the minimum length for effective silencing when operated at 100 psi.

Table 7 shows, for each nozzle size for a given silencer diameter—which is smaller than the preferred diameters set out in Table 4—a minimum length for effective silencing when operated at 100 psi.

Table 10 shows, for each nozzle size for the given diameter—which is larger than the preferred diameters set out in Table 4—the minimum length for effective silencing when operated at 100 psi. Similarly, the same approach of setting out minimum length for effective silencing for preferred, smaller and larger diameters is repeated for nozzles with area ratios (A/A*) of 1.42 in Tables 14 to 18 and with area ratios (A/A*) of 2.1 in tables 19-23 in order to provide a range of diameters and lengths of effective silencers at the pressures listed in the tables.

TABLE 4

Preferred silencer diameter and length and minimum silencer lengths for effective silencing for a nozzle with P_design of 100psi and operated at 100psi

| Nozzle Size | Preferred Diameter (mm) | Preferred Length (mm) | Minimum Length for effective silencing (mm) |
|---|---|---|---|
| No. 3 | 11.8 | 37.5 | 23.5 |
| No. 4 | 15.7 | 50.0 | 31.0 |
| No. 5 | 19.6 | 62.5 | 39.0 |
| No. 6 | 23.5 | 75.0 | 46.5 |
| No. 7 | 27.4 | 87.5 | 54.5 |
| No. 8 | 31.3 | 100.0 | 62.0 |
| No. 10 | 39.2 | 125.0 | 77.5 |

TABLE 5

Preferred silencer diameter and minimum silencer lengths for effective silencing for a nozzle with P_design of 100 psi and operated at 80 psi
For effective operation at supply pressure P* = 80 psi

| Nozzle Size | Preferred Diameter (mm) | Minimum Length for effective silencing (mm) |
|---|---|---|
| No. 3 | 11.8 | 37.0 |
| No. 4 | 15.7 | 49.0 |
| No. 5 | 19.6 | 61.0 |
| No. 6 | 23.5 | 73.5 |
| No. 7 | 27.4 | 85.5 |
| No. 8 | 31.3 | 98.0 |
| No. 10 | 39.2 | 122.0 |

TABLE 6

Preferred silencer diameter and minimum silencer lengths for effective silencing for a nozzle with P_design of 100 psi and operated at 120 psi
For effective operation at supply pressure-P* = 120 psi

| Nozzle Size | Preferred Diameter (mm) | Minimum Length for effective silencing (mm) |
|---|---|---|
| No. 3 | 11.8 | 16.0 |
| No. 4 | 15.7 | 21.5 |
| No. 5 | 19.6 | 27.5 |
| No. 6 | 23.5 | 32.0 |
| No. 7 | 27.4 | 37.0 |
| No. 8 | 31.3 | 42.5 |
| No. 10 | 39.2 | 53.0 |

TABLE 7

Silencer diameter and minimum lengths for effective silencing for a nozzle with P_design of 100 psi and operated at 100 psi
For effective operation at supply pressure-P* = 100 psi

| Nozzle Size | Diameter (Smaller than preferred diameter of Table 4) (mm) | Minimum Length for effective silencing (mm) |
|---|---|---|
| No. 3 | 10.0 | 11.0 |
| No. 4 | 13.3 | 15.0 |
| No. 5 | 16.7 | 18.5 |
| No. 6 | 20.0 | 22.0 |
| No. 7 | 23.3 | 25.5 |
| No. 8 | 26.7 | 29.5 |
| No. 10 | 33.3 | 36.5 |

TABLE 8

Silencer diameter and minimum lengths for effective silencing for a nozzle with P_design of 100 psi and operated at 80 psi
For effective operation at supply pressure-P* = 80 psi

| Nozzle Size | Diameter (mm) | Minimum Length for effective silencing (mm) |
|---|---|---|
| No. 3 | 10.0 | 17.5 |
| No. 4 | 13.3 | 23.0 |
| No. 5 | 16.7 | 29.0 |
| No. 6 | 20.0 | 34.5 |
| No. 7 | 23.3 | 40.5 |
| No. 8 | 26.7 | 46.0 |
| No. 10 | 33.3 | 57.5 |

TABLE 9

Silencer diameter and minimum lengths for effective silencing for a nozzle with P_design of 100 psi and operated at 120 psi
For effective operation at supply pressure-P* = 120 psi

| Nozzle Size | Target Diameter (mm) | Minimum Length for effective silencing (mm) |
|---|---|---|
| No. 3 | 10.0 | 7.5 |
| No. 4 | 13.3 | 10.0 |
| No. 5 | 16.7 | 12.5 |
| No. 6 | 20.0 | 15.0 |
| No. 7 | 23.3 | 17.5 |
| No. 8 | 26.7 | 20.0 |
| No. 10 | 33.3 | 25.0 |

TABLE 10

Silencer diameter and minimum lengths for effective silencing for a nozzle with P_design of 100 psi and operated at 100 psi
For effective operation at ideal supply pressure-P* = 100 psi

| Nozzle Size | Diameter (Larger than preferred diameter of Table 4) (mm) | Minimum Length for effective silencing (mm) |
|---|---|---|
| No. 3 | 13.6 | 43.0 |
| No. 4 | 18.1 | 57.0 |
| No. 5 | 22.6 | 71.5 |
| No. 6 | 27.1 | 85.5 |
| No. 7 | 31.6 | 100.0 |
| No. 8 | 36.1 | 113.5 |
| No. 10 | 45.2 | 142.5 |

TABLE 11

Silencer diameter and minimum lengths for effective silencing for a nozzle with P_design of 100 psi and operated at 80 psi
For effective operation at supply pressure-P* = 80 psi

| Nozzle Size | Diameter (mm) | Minimum Length for effective silencing (mm) |
|---|---|---|
| No. 3 | 13.6 | 67.5 |
| No. 4 | 18.1 | 90.0 |
| No. 5 | 22.6 | 112.5 |
| No. 6 | 27.1 | 135.5 |
| No. 7 | 31.6 | 157.5 |
| No. 8 | 36.1 | 179.5 |
| No. 10 | 45.2 | 224.5 |

TABLE 12

Silencer diameter and minimum lengths for effective silencing for a nozzle with P_design of 100 psi and operated at 120 psi
For effective operation at supply pressure-P* = 120 psi

| Nozzle Size | Target Diameter (mm) | Minimum Length for effective silencing (mm) |
|---|---|---|
| No. 3 | 13.6 | 29.5 |
| No. 4 | 18.1 | 39.0 |
| No. 5 | 22.6 | 48.5 |
| No. 6 | 27.1 | 58.5 |
| No. 7 | 31.6 | 68.0 |
| No. 8 | 36.1 | 77.5 |
| No. 10 | 45.2 | 97.0 |

Effective silencing continues to occur at lengths longer than the minimum effective length. The length of the silencer above this minimum length is constrained by the practical constraints for the blasting application.

The following table—Table 13 describes the preferred silencer geometry, meaning it gives robust performance and considers other factors relevant to blasting along with effective silencing. The following two examples in Table 13 correspond to relevant geometries that provide effective silencing when operated at 100 psi (P_Design inlet pressure). This provides coverage of relevant geometries that would be effective and that could be considered useful in a blasting application when operated at the 100 psi nozzle inlet pressure. This provides a lower and upper bound to the silencer geometries that could be considered effective when blasting using a nozzle with an area ratio A/A* of 1.63±5%.

TABLE 13

Preferred and alternate silencer geometries for effective silencing for use with nozzles with an area ratio A/A* of 1.63 ± 5 and an P__design pressure of 100 psi where effective silencing commences at 80 psi (ie P* = 80 psi).

| | Preferred Silencer dimensions when the nozzle is operated P__Design = 100 psi | | Alternate silencer dimensions when the nozzle is operated at P__Design 100 psi (example 1) | | Alternate silencer dimensions when the nozzle is operated at P__Design 100 psi (example 2) | |
|---|---|---|---|---|---|---|
| Nozzle Size | Length (mm) | Diameter (mm) | Length (mm) | Diameter (mm) | Length (mm) | Diameter (mm) |
| No. 3 | 37.5 | 11.75 | 67.5 | 13.5 | 17.5 | 10.0 |
| No. 4 | 50 | 15.67 | 90.0 | 18.0 | 23.0 | 13.0 |

TABLE 13-continued

Preferred and alternate silencer geometries for effective silencing for use with nozzles with an area ratio A/A* of 1.63 ± 5 and an P_design pressure of 100 psi where effective silencing commences at 80 psi (ie P* = 80 psi).

| | Preferred Silencer dimensions when the nozzle is operated P_Design = 100 psi | | Alternate silencer dimensions when the nozzle is operated at P_Design 100 psi (example 1) | | Alternate silencer dimensions when the nozzle is operated at P_Design 100 psi (example 2) | |
|---|---|---|---|---|---|---|
| Nozzle Size | Length (mm) | Diameter (mm) | Length (mm) | Diameter (mm) | Length (mm) | Diameter (mm) |
| No. 5 | 62.5 | 19.58 | 112.5 | 22.5 | 29.0 | 16.5 |
| No. 6 | 75 | 23.5 | 135.0 | 27.1 | 34.5 | 20.0 |
| No. 7 | 87.5 | 27.1 | 157.5 | 31.5 | 40.5 | 23.0 |
| No. 8 | 100 | 31.33 | 179.5 | 36.0 | 46.0 | 26.5 |
| No. 10 | 125 | 39.16 | 224.5 | 45.0 | 57.5 | 33.0 |

It is known that abrasive blasting nozzles can have a range of area ratios A/A* other than 1.63 and can be operated at various inlet pressures. The following tables contain dimensions for effective silencers for nozzles with two different area ratios A/A* operated at range of inlet pressures including 80 psi, 100 psi and 120 psi.

Silencer geometries for effective silencing are set out in Table 14 to Table 18 for a nozzle with an area ratio of 1.42±5%.

TABLE 14

Silencer diameter and minimum lengths for effective silencing for a nozzle with P_design of 81 psi and operated at 80 psi For effective operation at supply pressure-P* = 80 psi

| Nozzle Size | Diameter (mm) | Minimum Length for effective silencing (mm) |
|---|---|---|
| No. 3 | 10.95 | 18.0 |
| No. 4 | 14.60 | 24.0 |
| No. 5 | 18.26 | 30.0 |
| No. 6 | 21.91 | 36.0 |
| No. 7 | 25.56 | 42.0 |
| No. 8 | 29.21 | 48.0 |
| No. 10 | 36.51 | 60.0 |

TABLE 15

Silencer diameter and minimum lengths for effective silencing for a nozzle with P_design of 81 psi and operated at 100 psi For effective operation at supply pressure-P* = 100 psi

| Nozzle Size | Diameter (mm) | Minimum Length for effective silencing (mm) |
|---|---|---|
| No. 3 | 10.95 | 11.5 |
| No. 4 | 14.60 | 15.5 |
| No. 5 | 18.26 | 19.0 |
| No. 6 | 21.91 | 23.0 |
| No. 7 | 25.56 | 26.5 |
| No. 8 | 29.21 | 30.5 |
| No. 10 | 36.51 | 38.0 |

TABLE 16

Silencer diameter and minimum lengths for effective silencing for a nozzle with P_design of 81 psi and operated at 80 psi For effective operation at supply pressure-P* = 80 psi

| Nozzle Size | Diameter (mm) | Minimum Length for effective silencing (mm) |
|---|---|---|
| No. 3 | 9.31 | 8.5 |
| No. 4 | 12.41 | 11.5 |
| No. 5 | 15.51 | 14.0 |
| No. 6 | 18.61 | 17.0 |
| No. 7 | 21.72 | 19.5 |
| No. 8 | 24.82 | 22.5 |
| No. 10 | 31.02 | 28.0 |

TABLE 17

Silencer diameter and minimum lengths for effective silencing for a nozzle with P_design of 81 psi and operated at 80 psi For effective operation at supply pressure-P* = 80 psi

| Nozzle Size | Diameter (mm) | Minimum Length for effective silencing (mm) |
|---|---|---|
| No. 3 | 12.60 | 33.0 |
| No. 4 | 16.80 | 44.0 |
| No. 5 | 21.00 | 55.0 |
| No. 6 | 25.20 | 65.5 |
| No. 7 | 29.40 | 76.5 |
| No. 8 | 33.60 | 87.5 |
| No. 10 | 42.00 | 109.5 |

TABLE 18

Silencer diameter and minimum lengths for effective silencing for a nozzle with P_design of 81 psi and operated at 100 psi For effective operation at supply pressure-P* = 100 psi

| Nozzle Size | Diameter (mm) | Minimum Length for effective silencing (mm) |
|---|---|---|
| No. 3 | 12.60 | 21.0 |
| No. 4 | 16.80 | 28.0 |
| No. 5 | 21.00 | 35.5 |
| No. 6 | 25.20 | 41.5 |
| No. 7 | 29.40 | 48.5 |
| No. 8 | 33.60 | 55.5 |
| No. 10 | 42.00 | 69.15 |

Silencer geometries for effective silencing are set out in Table 19 to Table 23 for a nozzle with an area ratio of 2.1±5%.

TABLE 19

| Silencer diameter and minimum lengths for effective silencing for a nozzle with P_design of 168 psi and operated at 100 psi For effective operation at supply pressure-P* = 100 psi | | |
|---|---|---|
| Nozzle Size | Diameter (mm) | Minimum Length for effective silencing (mm) |
| No. 3 | 13.32 | 78.5 |
| No. 4 | 17.76 | 104.5 |
| No. 5 | 22.20 | 130.5 |
| No. 6 | 26.64 | 157.0 |
| No. 7 | 31.08 | 183.0 |
| No. 8 | 35.52 | 209.0 |
| No. 10 | 44.40 | 261.0 |

TABLE 20

| Silencer diameter and minimum lengths for effective silencing for a nozzle with P_design of 168 psi and operated at 120 psi For effective operation at supply pressure-P* = 120 psi | | |
|---|---|---|
| Nozzle Size | Diameter (mm) | Minimum Length for effective silencing (mm) |
| No. 3 | 13.32 | 53.5 |
| No. 4 | 17.76 | 71.5 |
| No. 5 | 22.20 | 89.0 |
| No. 6 | 26.64 | 107.0 |
| No. 7 | 31.08 | 125.0 |
| No. 8 | 35.52 | 142.5 |
| No. 10 | 44.40 | 178.0 |

TABLE 21

| For effective operation at supply pressure -P* = 130psi | | |
|---|---|---|
| Nozzle Size | Diameter (mm) | Minimum Length for effective silencing (mm) |
| No. 3 | 13.32 | 45.5 |
| No. 4 | 17.76 | 60.5 |
| No. 5 | 22.20 | 75.5 |
| No. 6 | 26.64 | 90.5 |
| No. 7 | 31.08 | 105.5 |
| No. 8 | 35.52 | 120.5 |
| No. 10 | 44.40 | 150.5 |

Silencer diameter and minimum lengths for effective silencing for a nozzle with P_design of 168psi and operated at 130psi

TABLE 22

| For effective operation at supply pressure -P* = 100psi | | |
|---|---|---|
| Nozzle Size | Diameter (mm) | Minimum Length for effective silencing (mm) |
| No. 3 | 11.32 | 37.0 |
| No. 4 | 15.09 | 49.0 |
| No. 5 | 18.86 | 61.0 |
| No. 6 | 22.64 | 73.5 |
| No. 7 | 26.41 | 85.5 |
| No. 8 | 30.18 | 98.0 |
| No. 10 | 37.73 | 122.0 |

Silencer diameter and minimum lengths for effective silencing for a nozzle with P_design of 168psi and operated at 100psi

TABLE 23

| For effective operation at supply pressure -P* = 120psi | | |
|---|---|---|
| Nozzle Size | Diameter (mm) | Minimum Length for effective silencing (mm) |
| No. 3 | 11.32 | 25.0 |
| No. 4 | 15.09 | 33.5 |
| No. 5 | 18.86 | 42.5 |
| No. 6 | 22.64 | 50.0 |
| No. 7 | 26.41 | 58.5 |
| No. 8 | 30.18 | 66.5 |
| No. 10 | 37.73 | 83.5 |

Silencer diameter and minimum lengths for effective silencing for a nozzle with P_design of 168psi and operated at 120psi The inventors have tested the effectiveness of silencers when operated at inlet pressures other than the ideal supply pressure for the nozzle exit to throat ratio (A/A*) of 1.63 and have found silencers with dimensions as set out in Tables 2 to 13 to be effective when operated at the inlet pressures shown.

Additionally, the inventors have tested silencer designs for use with nozzle area ratios (A/A*) other than 1.63, including 1.42 and 2.1 and have confirmed silencer geometries as set out in Tables 14 to 23 to be effective when operated at the inlet pressures shown.

Figure 13:
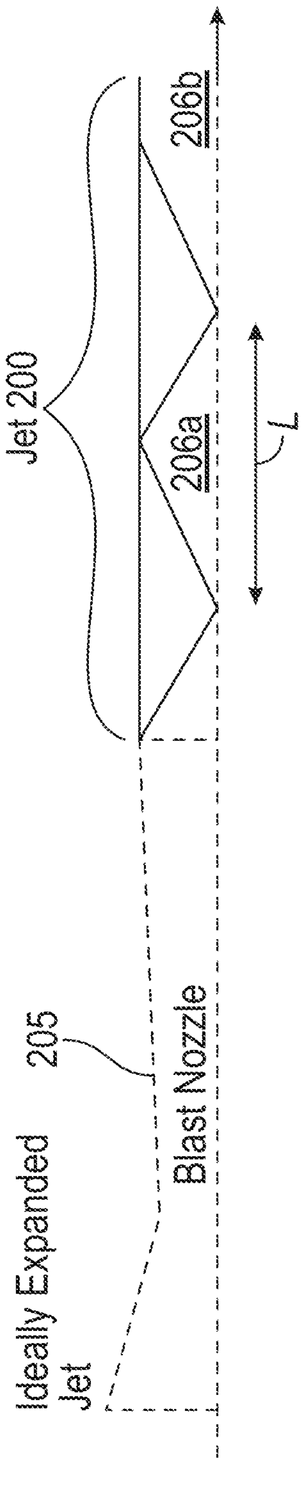
FIG. 13 is a diagram of the geometry of a nozzle, such as a nozzle according to FIGS. 3 to 8, producing an ideally expanded jet.
Figure 14:
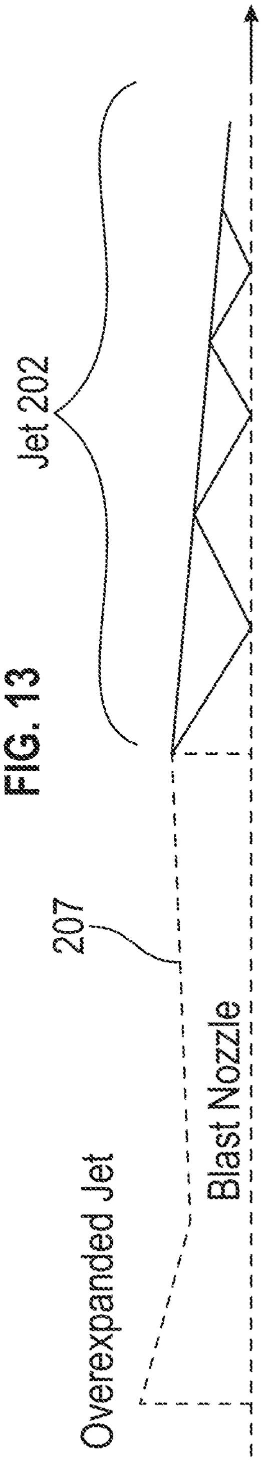
FIG. 14 is a diagram of a nozzle with a different geometry producing an overexpanded jet.

A ratio of the area A of the nozzle outlet 120 to area A* of the throat 116 is selected for expansion of the air through the nozzle 100 so it is neither under-expanded nor overexpanded as it exits the outlet 120 but rather is "ideally" expanded. The area ratio is about 1.63 for compressed air applied at 100 psi above ambient pressure. The area ratio 1.63 is an example of one nozzle area ratio—there are many others that will produce a substantially ideally expanded jet but at a different inlet pressure. Accordingly, the pressurised air exits the nozzle outlet 120 in a supersonic jet at ambient pressure. The jet imparts drag on the abrasive particles between the nozzle outlet and the workpiece. Consequently, the energy of the particles is increased over the standoff distance between the nozzle outlet 120 and the surface of the workpiece. The standoff distance is typically around 350 mm to 600 mm from the nozzle outlet to the workpiece in use. Consequently, nozzles according to embodiments herein are more effectively able to clean/abrade the surface of the workpiece than a nozzle designed to work in an overexpanded or underexpanded mode. The dimensions for a #6 blast nozzle as illustrated are set out in the third rows off the tables of FIGS. 13 and 14. Namely, the inlet opening 106 has a diameter of 32 mm, the throat 116 has a diameter of 9.53 mm and zero length, and the nozzle outlet 120 has a diameter of 12.18 mm. The throat and the nozzle outlet are separated by a distance L of 220 mm. The throat and the nozzle inlet are separated by a distance of about 36 mm. It will be realised that these dimensions are provided for exemplary purposes. Dimensions for #3, #7 and #8 blast nozzles are similarly also set out in the tables of FIGS. 13 and 14.

In determining the optimal nozzle length, it was found that for a #6 nozzle 220 mm was the best length from testing with #60/30 garnet (0.3 mm particle size, 4100 lg/$m^3$ density). The optimal length for a #6 nozzle may be longer in other embodiments such as 300 mm. There may be other considerations, such as access and ergonomics, which limit the utility of a longer nozzle. In general, longer nozzles are better suited to larger, heavier abrasive blends, whilst shorter nozzles are better suited for lighter and smaller blends. A preferred range on the diverging section length L for embodiments of the nozzle is 70-300 mm.

It will be realised that when a nozzle with a given nozzle outlet to nozzle throat area ratio (A/A*), is operated at a supply pressure other than the ideal supply pressure the jet produced will be overexpanded if the inlet pressure is lower than ideal supply pressure and underexpanded if the inlet pressure is higher than the ideal supply pressure.

Figure 15:
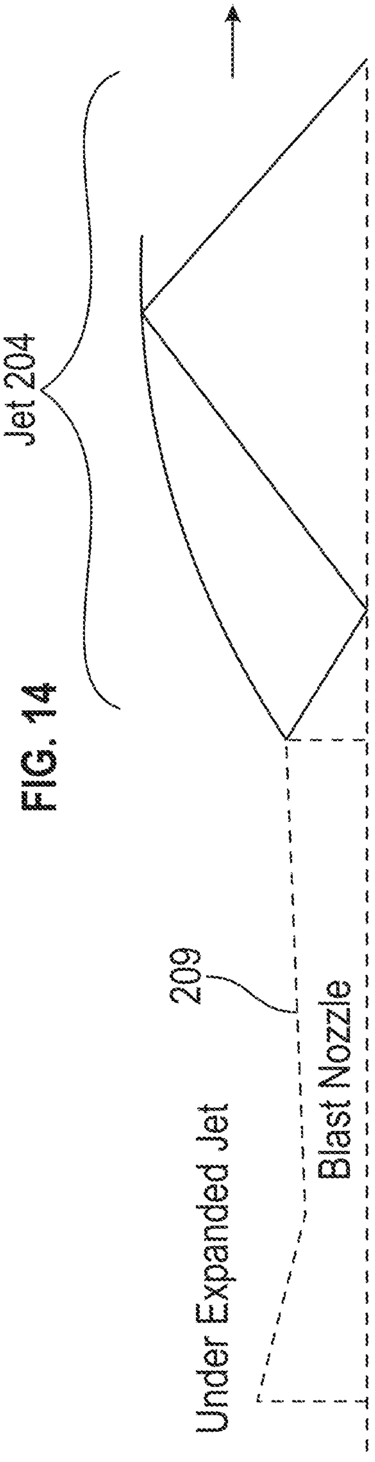
FIG. 15 is a diagram of a nozzle with another different geometry producing an underexpanded jet.
Figure 16:
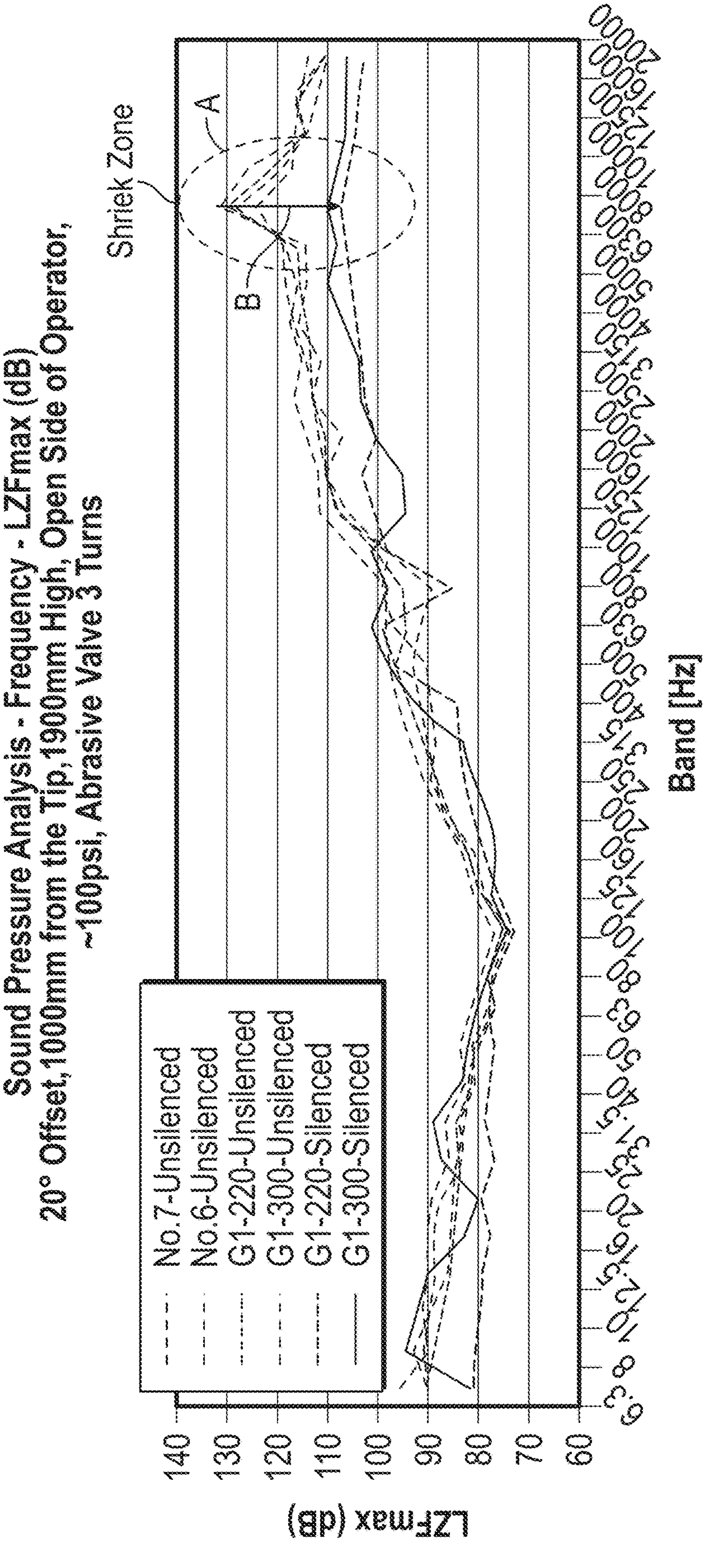
FIG. 16 is a graph showing the effectiveness of a silencer according to an embodiment of the present invention in reducing noise pressure to thereby suppress screech tone and broadband noise from a nozzle.
Figure 17:
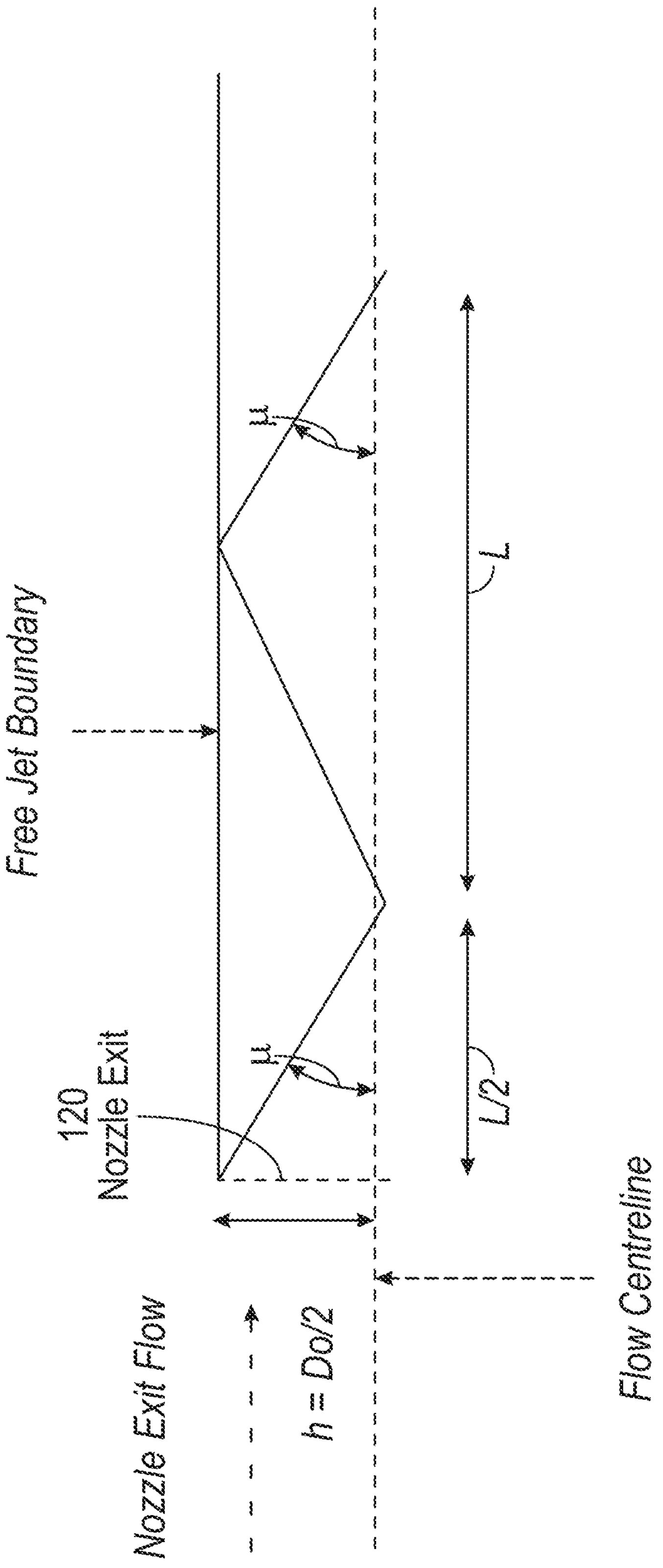
FIG. 17 is a diagram illustrating the Mach angle μ in a supersonic free jet.
Figure 18:
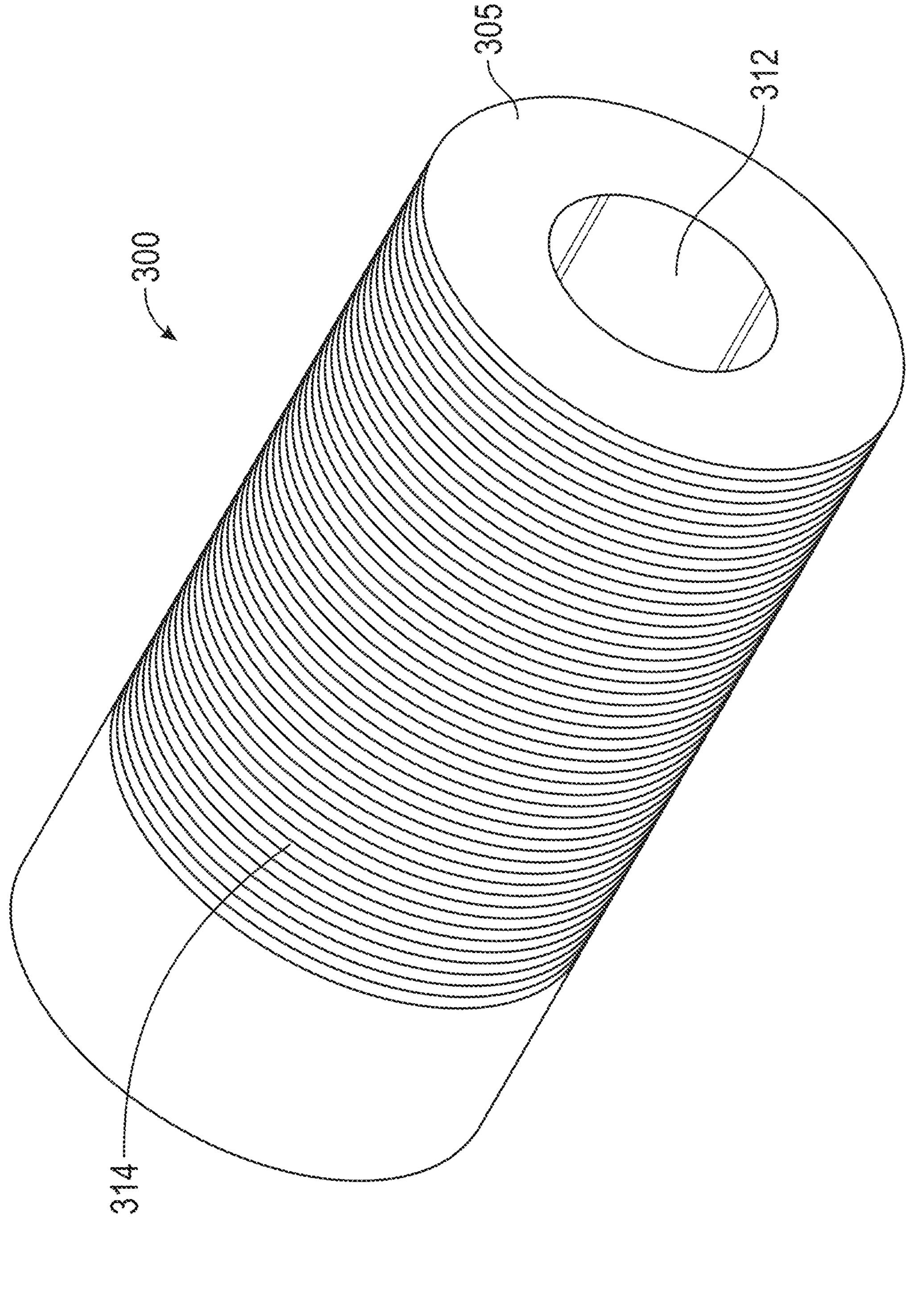
FIGS. 18 to 20 depict a silencer according to an embodiment of the present invention for use with nozzles that would produce supersonic jet—in this case inlet pressure greater than 80 psi.

FIGS. 15, 16 and 17 respectively illustrate the profiles of exhaust jets produced by blast nozzles 205, 207 and 209 where the exhaust jets respectively comprise an ideally expanded jet 200 (jet exits nozzle at ambient pressure), an overexpanded jet 202 (jet exits nozzle at less than ambient pressure) and an under-expanded jet 204 (jet exits nozzle at greater than ambient pressure).

The Inventors have hypothesised that the shear region, which is typically between the $3^{rd}$ and $5^{th}$ shock diamonds that form in the substantially ideally expanded jet downstream of the non-silenced nozzle exit at the design pressure, is where the dominant acoustic emissions, e.g. "screech" originate, does not move significantly over the inlet operating pressure range of the nozzle for a substantially ideally expanded jet produced by an unsilenced nozzle, e.g. the nozzles of FIGS. 2 to 7. It is believed that the supersonic jet remains close to cylindrical over this operating range and the locations of recurring shock diamonds created by an unsilenced nozzle, e.g. first shock diamond 206*a* and second shock diamond 206*b*, do not significantly shift axially as the inlet pressure varies over the operating range, e.g. from 80-120 psi above ambient pressure.

The Inventors have made measurements for jet emitted from an unsilenced G1 220 nozzle geometry downstream of the nozzle exit at various operating pressures (120, 110, 100, 90 and 80 PSI). Shock diamonds were observed to be present with increasing shock strength as pressure was increased. It was observed that the shock diamonds do not appear to elongate with increasing pressure thus indicating that the region of dominant acoustic emissions does not move with variations in pressure.

In contrast, similar measurements in respect of a jet from a prior art, non-ideally, overexpanded, nozzle for each of the same pressure settings found that the shock diamonds elongated with increasing pressure and were stronger at lower pressure.

The elongation of the shock diamonds indicated shifting of the position of the dominant acoustic emission zone for the overexpanded unsilenced blast nozzle.

As will be explained, silencers according to embodiments herein are able to supress and reduce noise emissions from a nozzle operating above P*, such as nozzles according to embodiments described in international patent application No. PCT/AU2021/050827, examples of which are set out in FIGS. 2 to 5, 13 and 14, however nozzles with other area ratios (A/A*) will also be effect at supply pressure greater than P*.

Testing has shown that silencers according to embodiments of the present invention to remain effective over a pressure range of 80 to greater than 120 psi inlet pressure, both with and without abrasive within the gas flow, with an upper limit of the typical maximum pressure for blasting systems currently in use −150 psi.

Inventors have found that prior art silencers for overexpanded nozzles are very sensitive to pressure and can only operate at ±1 to 2 PSI of their design pressure.

The Inventors believe that this is because the operating pressure is not adequate to modify the jet entering the silencer as previously described therefore not creating the conditions required for effective silencing.

Additionally, field testing confirms that the noise reduction achieved by using a silencer according to an embodiment herein has minor impact the abrasive blasting productivity rate for a range of surface coatings. This ensures the productivity rate that can be achieved when not using the silencer is the similar to the productivity rate that can be achieved when using the silencer, in the described way, without the need to change the abrasive usage rate, compressed air volume or blast pot pressure setting.

As previously alluded to, the highest sound pressure generated in supersonic free jet systems is known to be in the outer shear region between the $3^{rd}$ and 5th shock diamonds that form in the substantially ideally expanded jet downstream of the non-silenced nozzle exit at the ideal inlet pressure. This zone is also known as the screech zone as is characterised by the generation of a peak sound level at a specific frequency, known as the screech frequency. This can be seen in FIG. 16 which demonstrates that for an unsilenced blast nozzle operating at 100 psi the screech frequency is approximately 8,000 Hz. As is also shown in FIG. 16, a silencer according to an embodiment of the present invention effectively reduces the sound pressure generated at this frequency by more than 20 dB. Reductions are also observed at other frequencies. With reference to FIG. 17, the distance L between shock diamonds for an unsilenced supersonic jet operating at close to ideal inlet pressure can be approximated based on the Mach Angle μ which is a function of Mach number M.

The formula for calculating the Mach Angle (μ) is as follows:

$$\sin\mu = 1/M$$

$$\mu = \sin^{-1}\left(\frac{1}{M}\right)$$

For a G1 #6 ideally expanded supersonic blast nozzle the outlet area to throat area ratio (A/A*) of the blast nozzle is 1.63346102 as shown in the table of FIG. 12.

The equation relating the area ratio to Mach number M is:

$$\frac{A}{A*} = \left(\frac{\gamma+1}{2}\right)^{\frac{-(\gamma+1)}{2(\gamma-1)}} \frac{\left(1 + \frac{\gamma-1}{2}M^2\right)^{\frac{(\gamma+1)}{2(\gamma-1)}}}{M}$$

Where γ is the specific heat ratio, which is typically 1.4 for air on standard day conditions. The above equation can be solved numerically for M, for example using the calculator at https://www.grc.nasa.gov/WWW/K-12/airplane/astar.html (retrieved 16 Oct. 2020) to find M=1.9

$$\mu = \sin^{-1}\left(\frac{1}{1.9}\right) = 31.75°$$

$$h = Do/2 = 6.09 \text{ mm}$$

$$\tan\mu = 2\ \text{h}/L$$

$$L = \frac{2\ \text{h}}{\tan\mu}$$

$$L = \frac{2(6.09)}{\tan 31.75} = 19.68$$

For a supersonic nozzle operating at inlet pressures sufficient for supersonic operation, the nozzle outlet Mach number is a function of geometry only. For a given geometry, there is a unique ideal pressure ratio. Nozzles, such as the ideally expanded blast nozzle described in the previously discussed PCT application, embodiments of which are set out herein with reference to FIGS. 2 to 5, 13 and 14, which have an embedded nozzle geometry that creates an ideal pressure ratio, will create an ideally expanded jet during operation.

It was found that the silencer continued to work at lengths greater than the minimum length. Thus while it may be longer, it is desirable that the silencer is of the preferred length and diameter as shown in Tables 4 to 6 for the nozzle size and operating inlet pressure.

TABLE 24

| Nozzle Size | Nozzle Throat Diameter mm | Nozzle Outlet Diameter mm | Nozzle Diverging Length mm |
|---|---|---|---|
| 3 | 4.7625 | 6.09 | 110.00 |
| 4 | 6.35 | 8.12 | 146.67 |
| 5 | 7.9375 | 10.15 | 183.33 |
| 6 | 9.525 | 12.18 | 220.00 |
| 7 | 11.1125 | 14.21 | 256.67 |
| 8 | 12.7 | 16.24 | 293.33 |

TABLE 25

| Nozzle Size# | Preferred Silencer Inner Diameter (ID) mm | Preferred Silencer Length mm |
|---|---|---|
| 3 | 11.75 | 37.50 |
| 4 | 15.67 | 50.00 |
| 5 | 19.58 | 62.50 |
| 6 | 23.50 | 75.00 |
| 7 | 27.42 | 87.50 |
| 8 | 31.33 | 100.00 |
| 10 | 39.16 | 125 |

Figure 20:
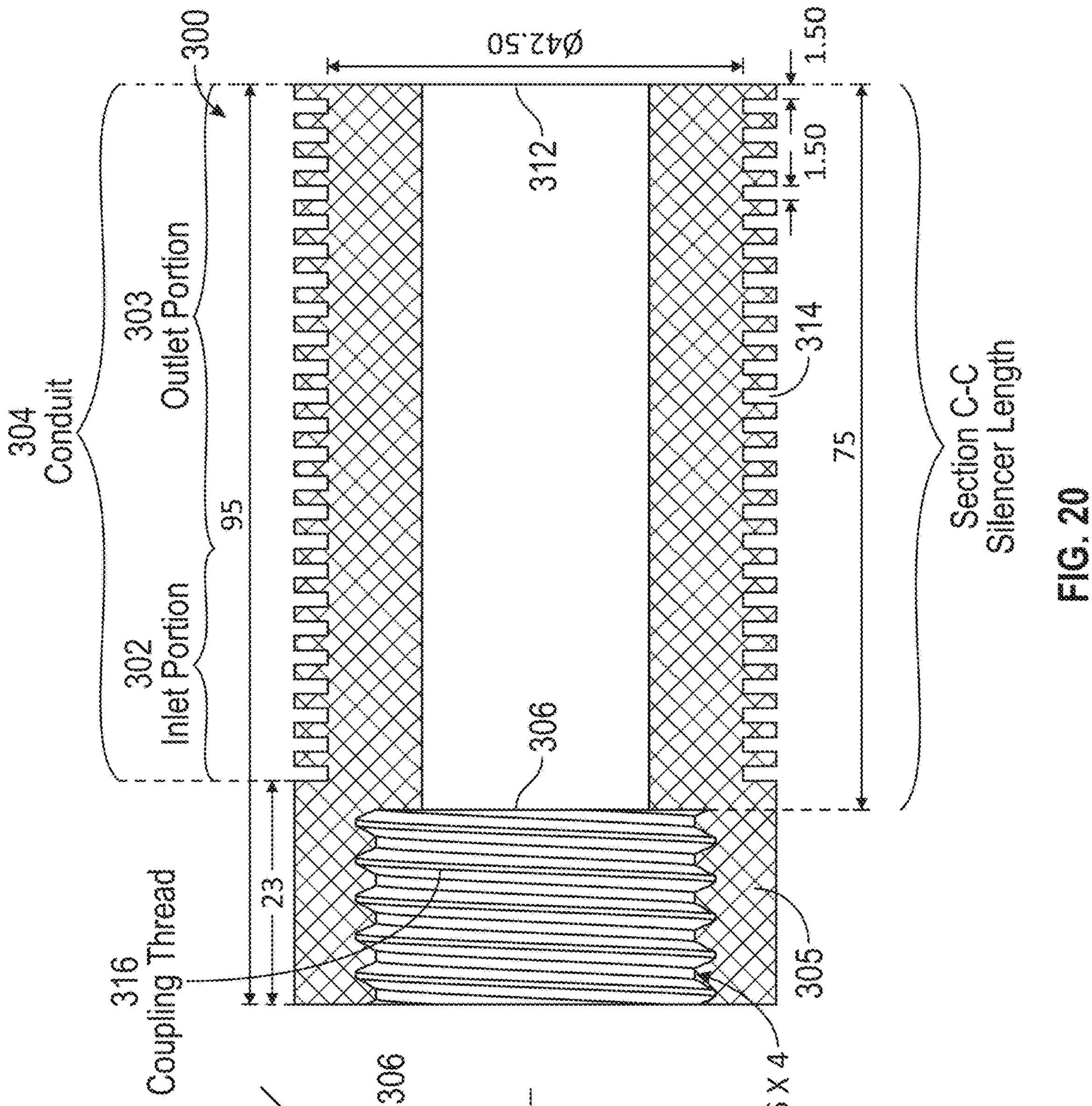
Figure 19:
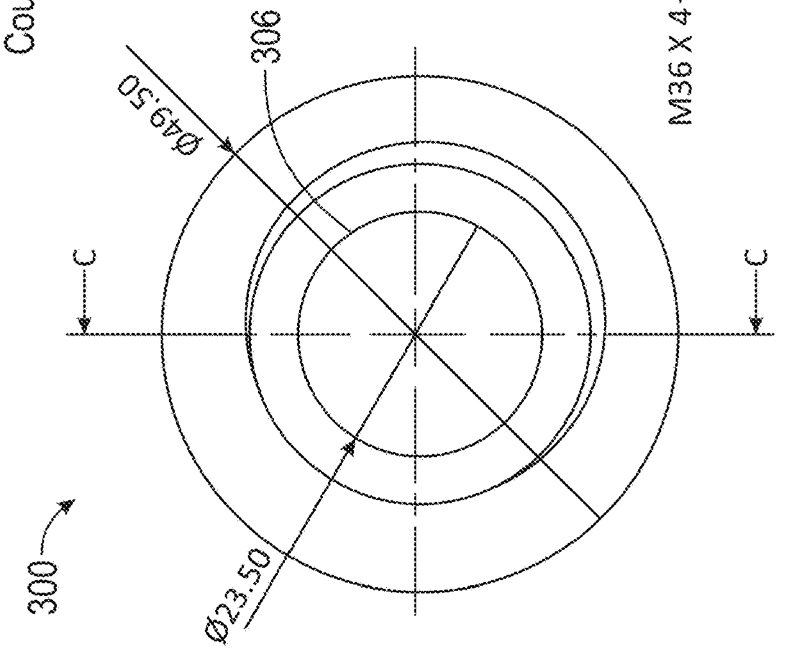
Figure 21:
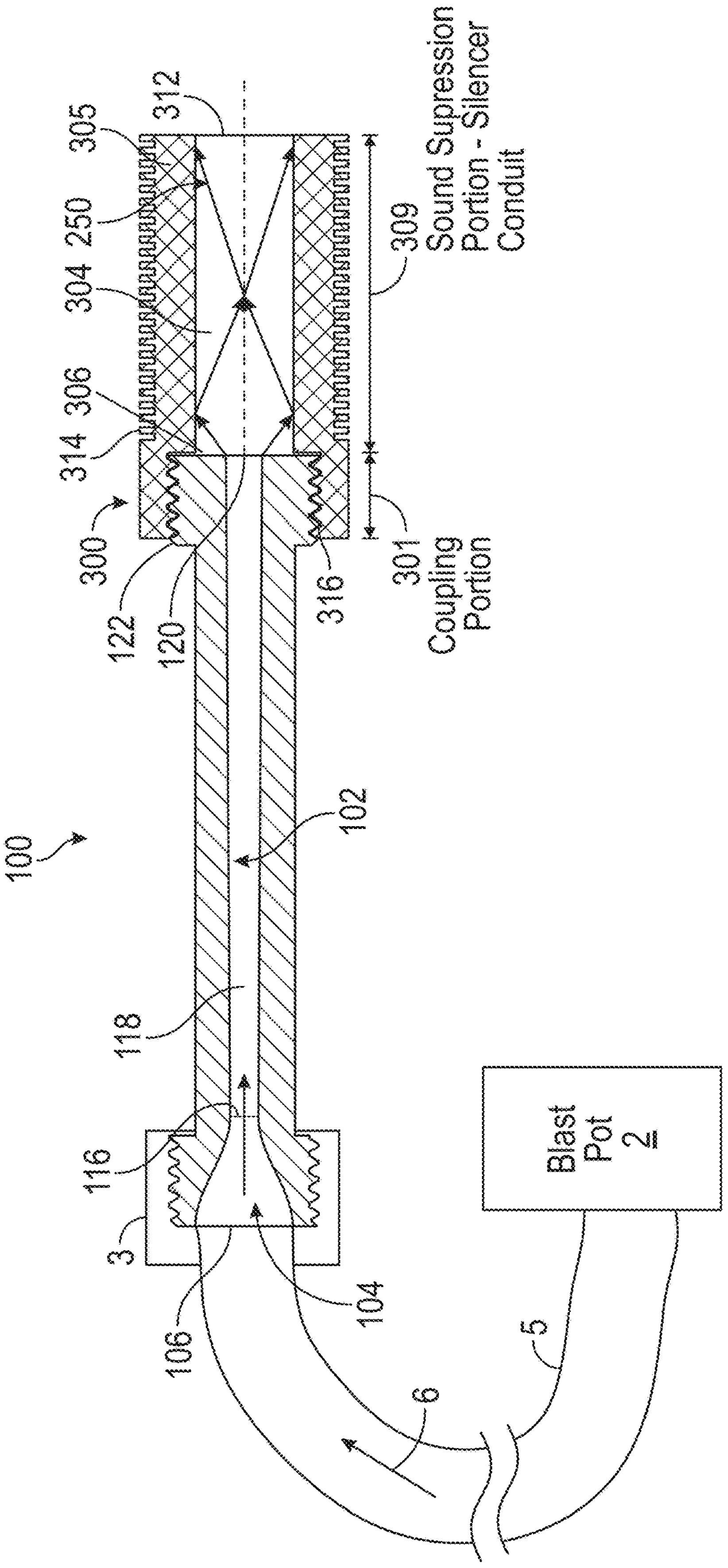
FIG. 21 is a second diagram showing the silencer of FIGS. 18 to 20 attached to a blast nozzle that is in turn coupled to a source of pressurised gas in the form of a blast pot to thereby provide a noise suppressed blasting system.
Figure 23:
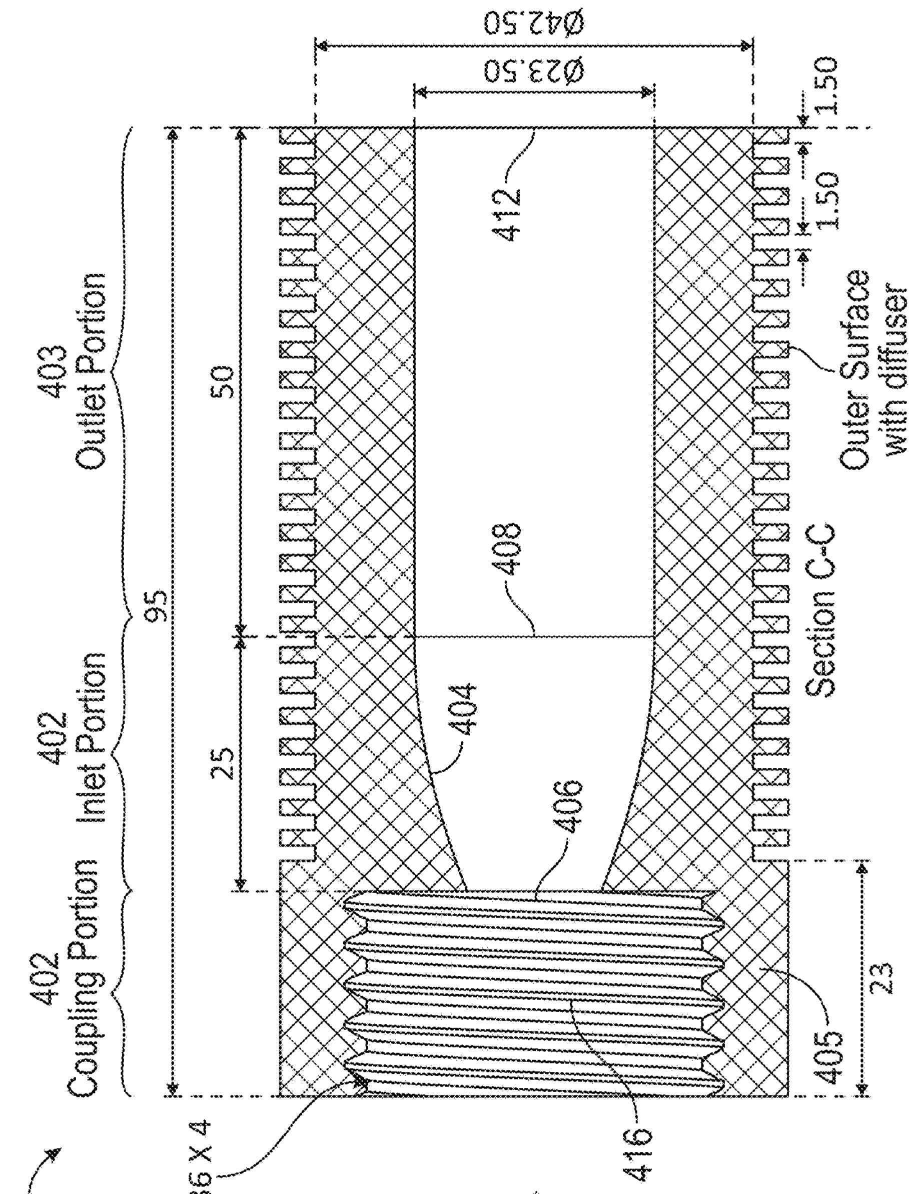
FIGS. 22 and 23 depict a silencer according to a further embodiment of the present invention for use with nozzles that would produce a significantly overexpanded supersonic jet. In this case inlet pressure less than 80 psi.
Figure 22:
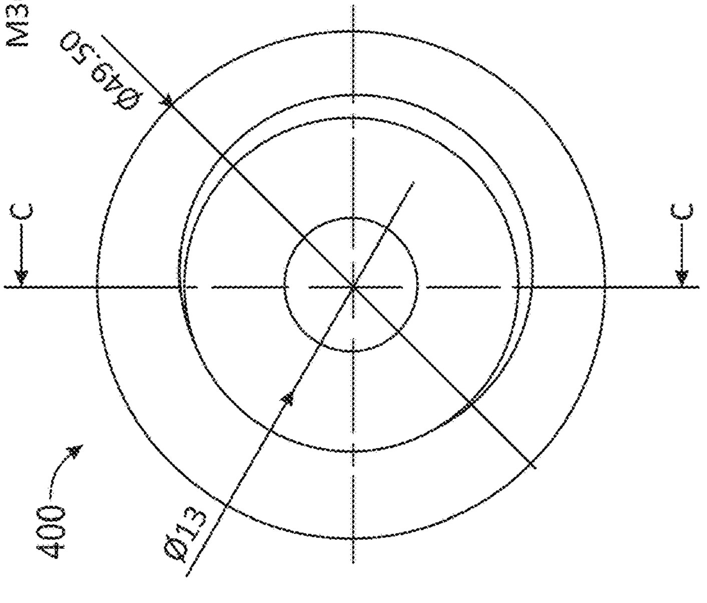

FIGS. 20 to 22 are views of a silencer according to an embodiment in the form of a #6 size silencer 300 specified in Table 25 above for use with a corresponding nozzle size as specified in Table 24 above. FIG. 21 shows a silencer 300 attached to a nozzle 100 in use. The silencer 300 is comprised of a body 305, preferably of a hardwearing material, that has a silencer conduit 304 formed therethrough. A coupling portion 301 of the body 305 is provided which includes a female coupling thread 316 formed concentric with the silencer conduit 304 for mating with a complementary male thread 122, as shown in FIG. 21, formed about an outlet end of the blast nozzle 100, adjacent nozzle outlet 120. It will be realised that other suitable fastening arrangements are possible, such as a bayonet type fastening arrangement. Furthermore, in some embodiments the nozzle and the silencer may be integrally formed together in a single piece.

Accordingly, as illustrated in FIG. 21, the silencer body 305 includes a coupling portion 301 arranged to connect to a complementary coupling portion of the nozzle 100 such as male thread 122 of the nozzle 100 adjacent the nozzle outlet 120. The body 305 also includes a sound suppression portion 309 extending from the coupling portion to the silencer outlet 312.

The sound suppression portion of the body with conduit 304 therethrough extends from the inlet 306, which is adjacent the coupling portion 301 to the outlet 312. The conduit 304 may be viewed as being divided into an inlet portion 302 (FIG. 20) which is continuous with an outlet portion 303 that ends in the silencer outlet 312. In the presently described embodiment the inlet portion and the outlet portion are continuous and colinear with no transition therebetween.

The silencer 300 includes a ribbed outer surface comprising concentric fins 314 that are provided to diffuse the sound energy absorbed by the silencer in use. The concentric fins 314, whilst not essential, are provided because in use the silencer encompasses a zone where a significant percentage of jet noise is generated, as illustrated in FIG. 6. Additionally, the ribbed outer surface of the silencer aids in heat transfer to the silencer body.

As previously mentioned, FIG. 21 shows the #6 silencer 300 coupled by means of female thread 316 to a male thread 122 formed about an end of the #6 nozzle 100 adjacent outlet 120 of the nozzle so that the outlet 120 of the nozzle is adjacent inlet 306 of silencer 300. The nozzle 100 is shown in use coupled to a source of blasting gas in the form of blast pot 2 by hose 5. Blast pot 2 is arranged to produce blasting gas, typically air entrained with abrasive particles 6, in a predetermined pressure range such as 80 to >120 psi above ambient pressure. Hose 5 is connected by hose connector 3 to nozzle inlet 106 of nozzle conduit 102 so that the gas proceeds through the nozzle inlet 106 and thence through nozzle inlet portion 104, through throat 116, through nozzle outlet portion 118 to be emitted out of the nozzle outlet 120. A ratio of the area (A) of the nozzle outlet 120 to the area (A*) of the throat 116 is set at a value that constrains the nozzle to emit a supersonic jet from the nozzle outlet. The air, with abrasive particles entrained, exits the nozzle 120 at supersonic speed and is received by the silencer. Referring again to FIG. 8, the geometry of an effective silencer modifies the supersonic jet 13 such that 1½ shock cells are created in the jet inside the silencer, no shock cells are created in the core jet 18 outside the silencer, and the jet exits the silencer with an established turbulent shear layer 20, and the jet entrains an annular jet 22 that sits around the outside of the core jet 18, to thereby enclose and suppress an acoustic emission region of the jet. In the presently described embodiment the silencer is preferably 75 mm long and 23.5 mm diameter, for optimal reduction of noise generated by the nozzle during its operation.

It was observed that a silencer according to the dimensions set out in Table 13 worked effectively from 80 PSI to >120 PSI.

Figure 24:
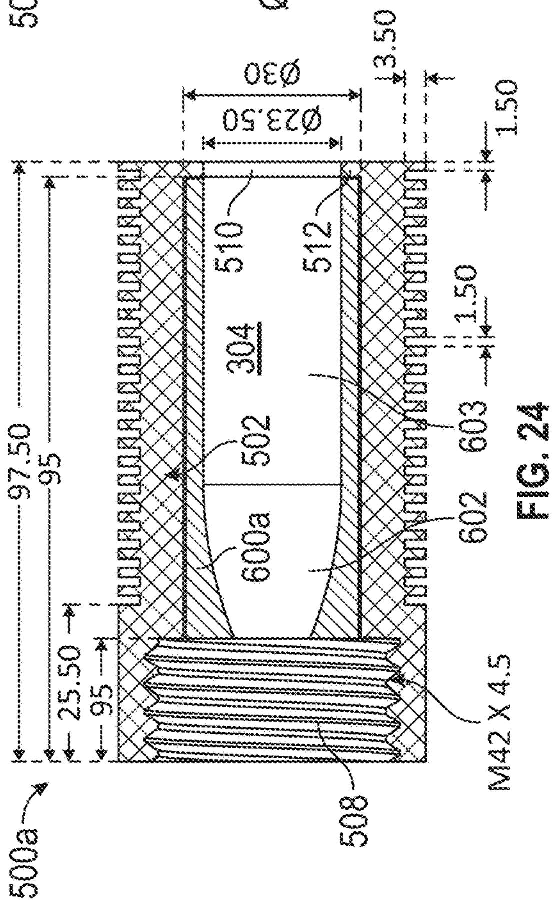
FIG. 24 depicts a silencer comprising a housing containing a replaceable liner defining an inlet portion of a silencer conduit for use with nozzles that would produce a significantly overexpanded supersonic jet. In this case inlet pressure less than 80 psi.
Figure 25:
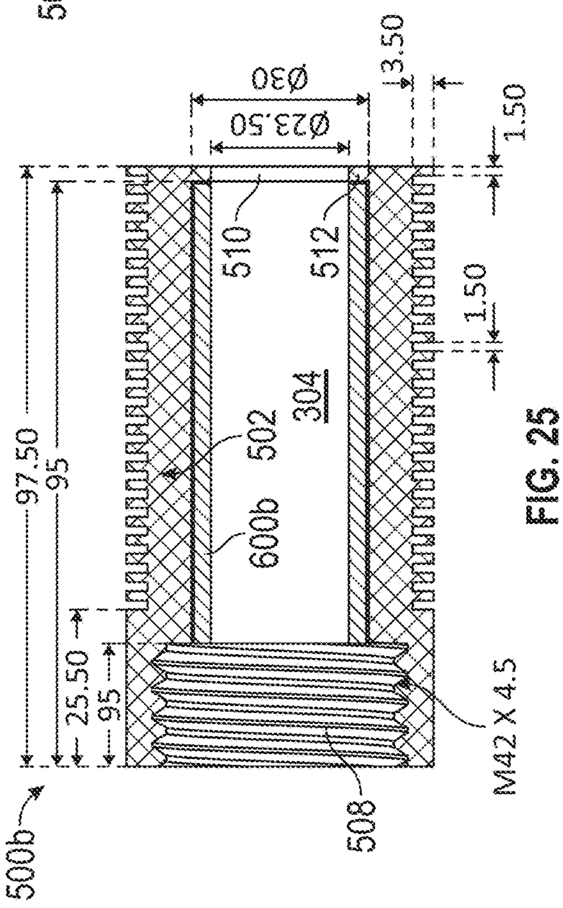
FIG. 25 depicts a silencer comprising a housing containing a replaceable liner defining a silencer conduit for use with nozzles that would produce a supersonic—in this case inlet pressure >80 psi.
Figure 26:
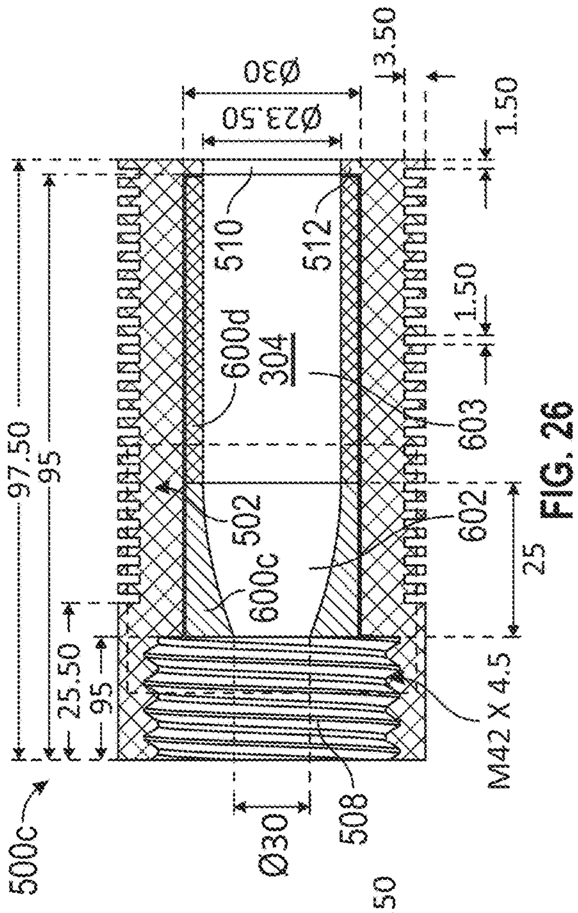
FIG. 26 depicts a silencer comprising a housing containing first and second liners, the first liner defining an inlet portion of a silencer conduit for use with nozzles that would produce a significantly overexpanded supersonic jet. In this case inlet pressure less than 80 psi.
Figure 27:
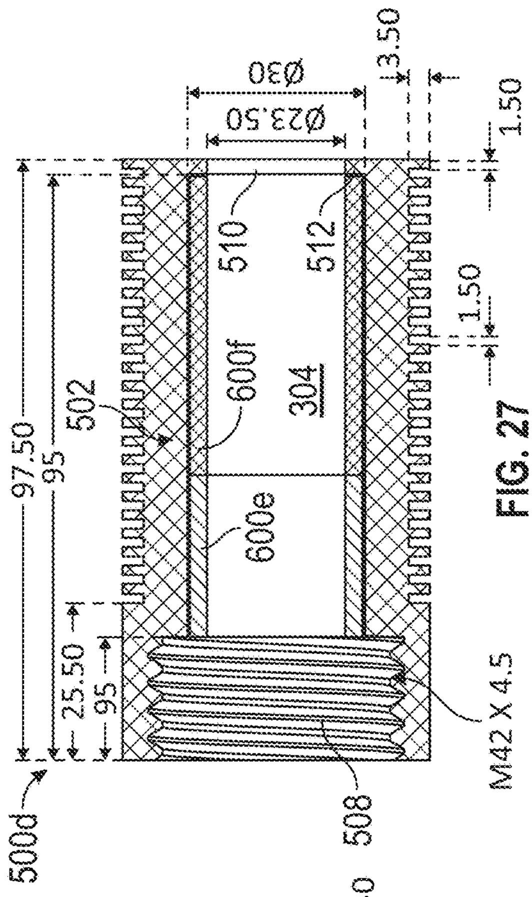
FIG. 27 depicts a silencer comprising a housing containing first and second liners the first liner defining an inlet portion of a silencer conduit for use with nozzles that would produce a supersonic jet—in this case inlet pressure greater than 80 psi.
Figure 29:
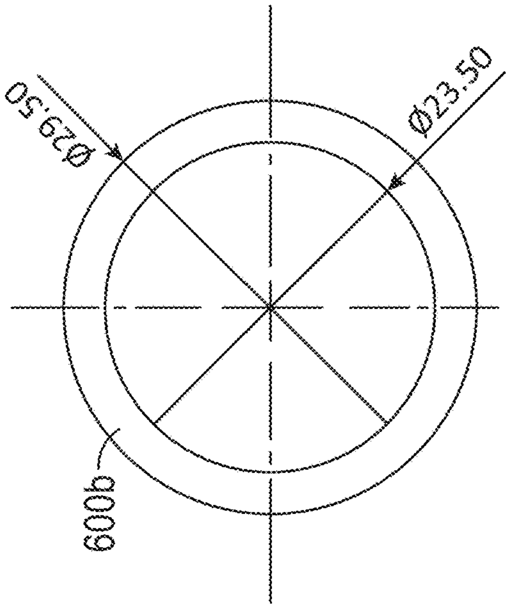
FIGS. 28 to 37 are further views of the liners depicted in FIGS. 17 to 20.
Figure 28:
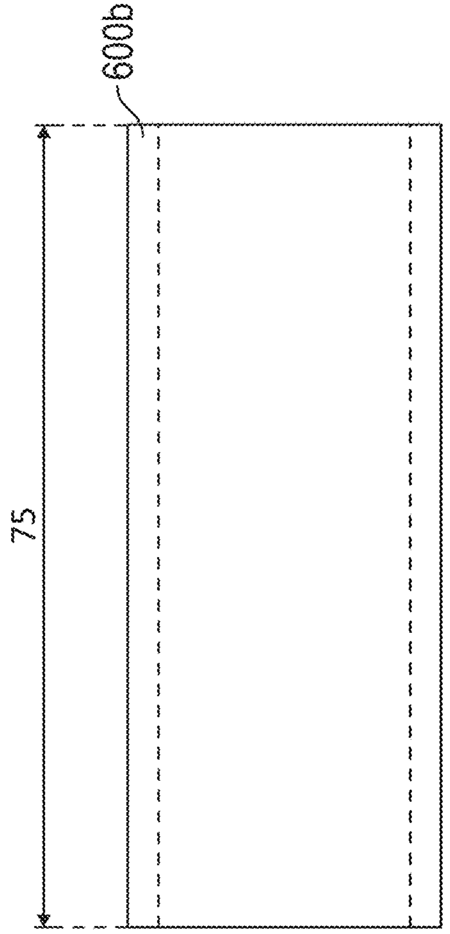
Figure 31:
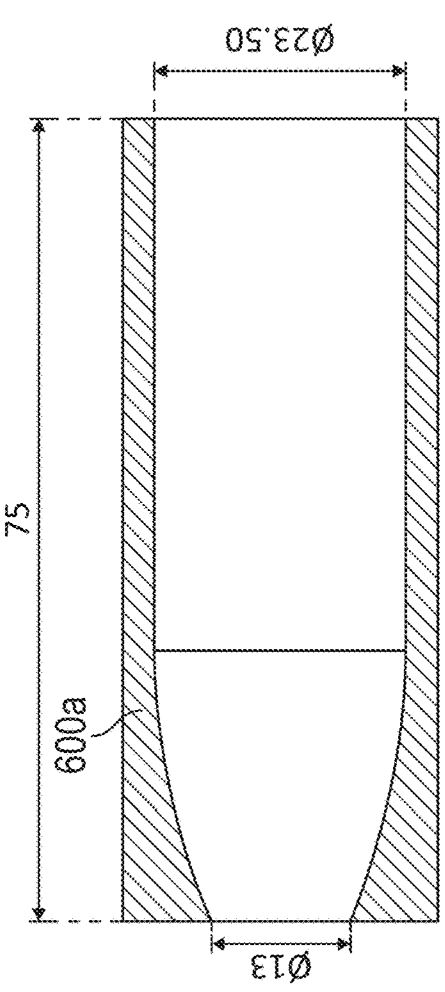
Figure 30:
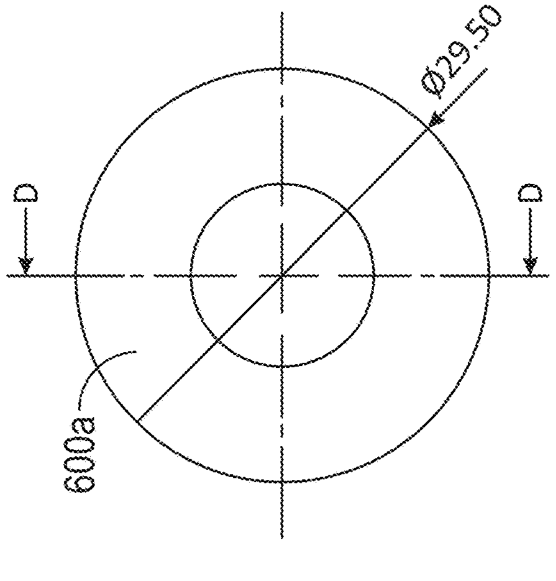
Figure 33:
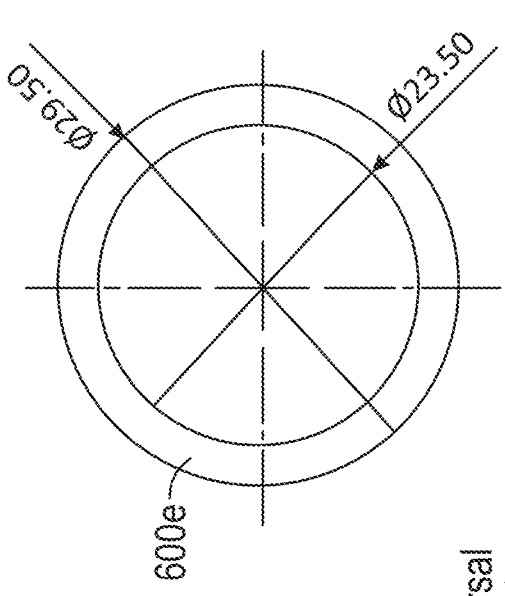
Figure 35:
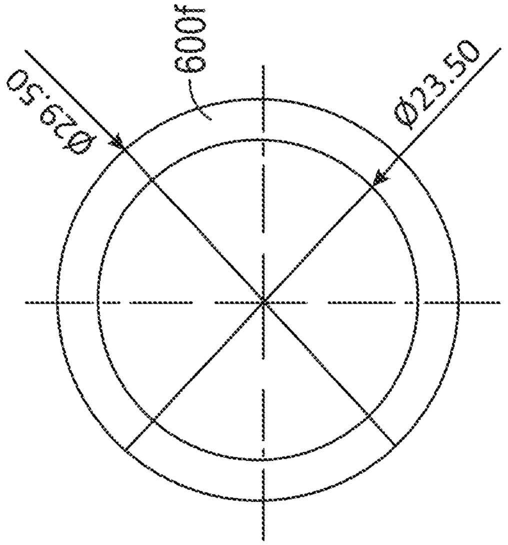
Figure 32:
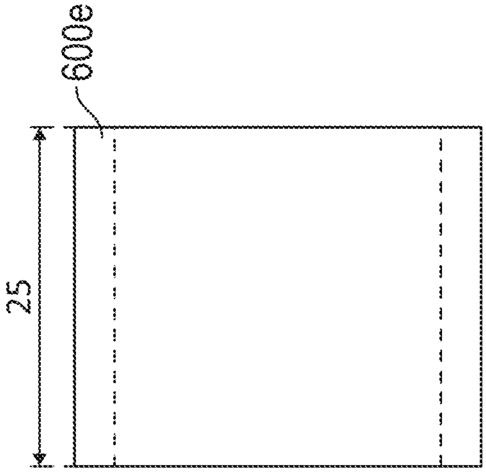
Figure 34:
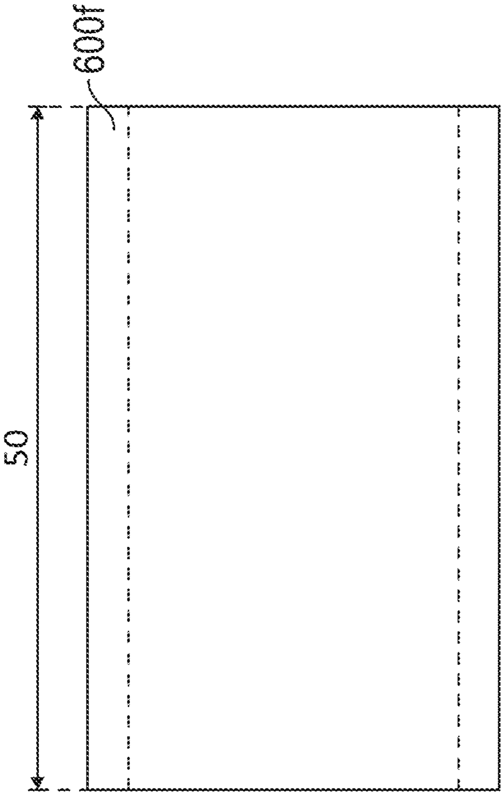
Figure 37:
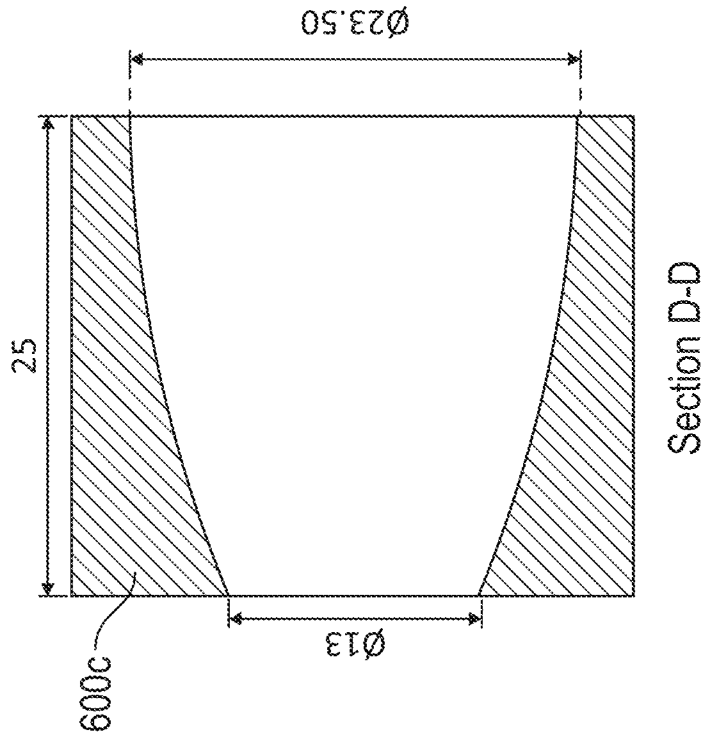
Figure 36:
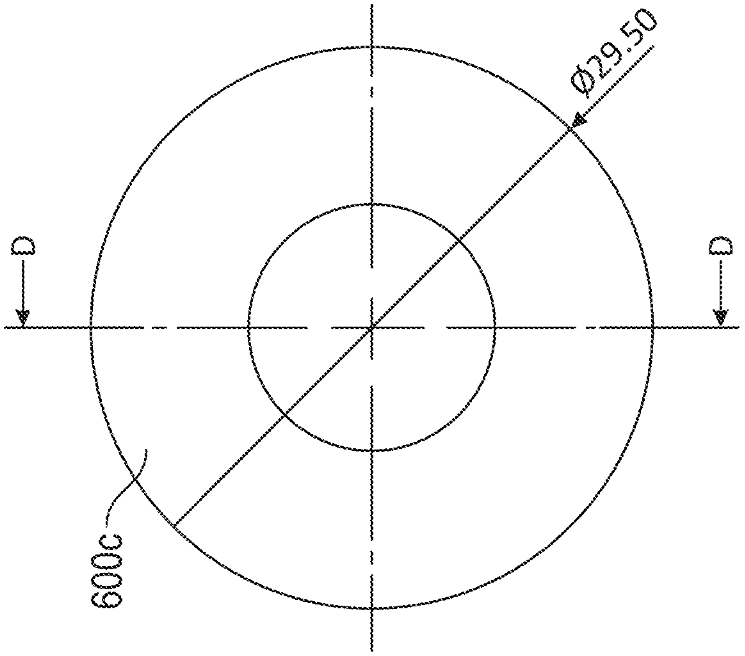
Figure 38:
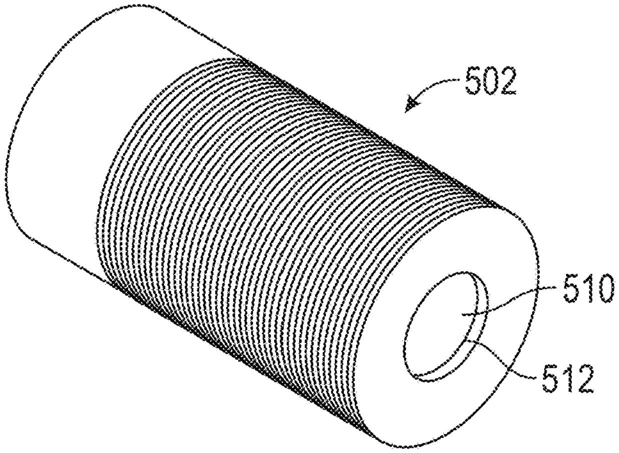
FIG. 38 is an isometric view of a housing of a body of a silencer according to an embodiment.
Figure 39:
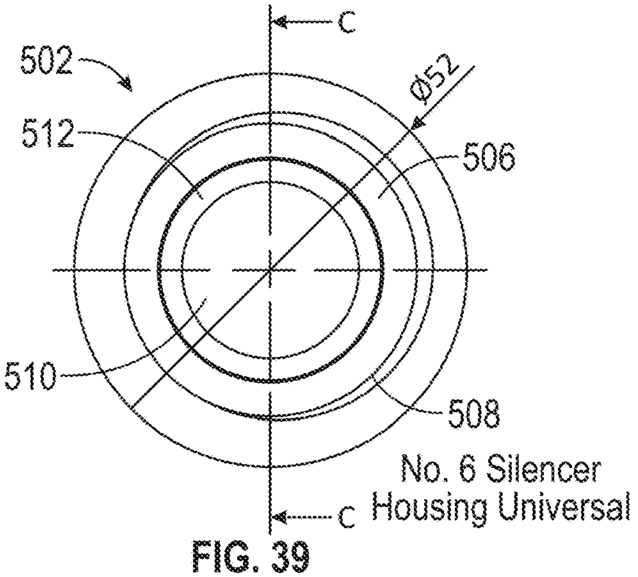
FIG. 39 is a plan inlet end view of the silencer of FIG. 21.

Below 80 PSI it was found that a modified silencer inlet increases the silencing effectiveness for effective operation of the silencer as depicted in FIGS. 24 and 25. The silencer 400 of FIGS. 24 and 25 includes a nozzle conduit comprised of an inlet portion 402 (check FIG. 25—ref. 402 is listed twice—once referring to the coupling portion and once referring to the inlet portion) with a smooth, bell-shaped, transition 404 from the smaller inlet 406 to a throat 408 from which an outlet portion 403 of the conduit extends to outlet 412. The outlet portion is preferably a right cylinder in shape. Whilst a bell-shaped transition 404 for the inlet portion 402 is preferred to minimise entropy rise of gas passing from inlet 406 to throat 408, other shapes, e.g., a frusto-conical profile may also be used. The silencer inlet 406 is just slightly bigger than the nozzle outlet 120. There is no discontinuity between the inlet portion and the outlet portion of the silencer. With the lower pressure, e.g., 70 psi to just under 80 psi the silencer 400 is designed for the significantly overexpanded jet as it comes out of the nozzle 120.

Overexpanded jets are more unstable and thus a smoother bell-shaped transition 404 helps to ensure that the amount of turbulence is reduced.

Referring now to FIGS. 26 to 29, there are depicted cross sections of silencers 500*a*, . . . , 500*d*, which are each comprised of a silencer housing 502 which houses one or more replaceable nozzle liners 600*a*, . . . , 600*f*, shown in detail in FIG. 28 to FIG. 35.

Referring again to FIG. 24, silencer 500*a* is comprised of silencer housing 502 with silencer insert 600*a* having been inserted through the coupling formation and pushed along the liner conduit 506 until a remote end of the silencer insert 504 abuts the lip 512.

Each of the silencer inserts 600*a*, . . . , 600*f* are outwardly cylindrical with an outer diameter that is just less than the diameter of the housing liner conduit 506 so that the silencer insert may be slid into the silencer conduit of the housing.

The silencer inserts 600*a*, . . . , 600*f* each define a silencer conduit 304. Silencers 500*a* and 500*c* are both intended for use with nozzles running at inlet gas pressures that result in an overexpanded jet, for example at pressures of 80 psi or less and typically in the range of 70 psi to 80 psi. Consequently, the single insert 600*a* of silencer 500*a* and the two inserts 600*c* and 600*d*, placed in series, of silencer 500*c*, replicate the silencer conduit shape of silencer 400 of FIGS. 24 and 25 and define a bell shaped inlet portion 602 and a right cylinder outlet portion 603.

It should be noted that the face of the corner of the nozzle exit 214 needs to be sufficiently sharp at this location so that an expansion fan forms and creates a sub-atmospheric pressure zone adjacent to the face of the nozzle exit when operated with the silencer fitted. This sub-atmospheric pressure zone is required for the first expansion wave to form enabling the development of the desired flow pattern described above. This will be achieved by a "rectangular/radial" face. However, the same will also be true for a backwards sloped face and some forward sloping faces. The silencing effect will stop once the face becomes so far forward sloping that the silencer simply becomes an extension of the nozzle, that is a continuation of the expanding section. In this case the expansion will continue or the flow will separate without the formation of a discrete low-pressure region. Having a near rectangular face is likely to be favourable for silencing when operated at pressures greater than P*, as it makes establishment of the sub atmospheric pressure zone favourable and it is easy to manufacture.

Silencers 500*b* (FIG. 25) and 500*d* (FIG. 27) are both intended for use with nozzles running at inlet gas pressures that result in a substantially ideally expanded jet, for example at pressures of 80 psi to 120 psi. Consequently, the single insert 600*b* of silencer 500*b* and the two inserts 600*e* and 600*f* of silencer 500*d*, which are placed in series, replicate the shape of conduit 304 of silencer 300 (FIG. 20) in that they present a silencer conduit that is a right cylinder with both inlet and outlet portions of the silencer being of the same diameter.

Since the axial length off insert 600*c* is the same as that of insert 600*e*, the two inserts may be interchanged depending on whether the silencer is to be used with an substantially ideally expanded jet nozzle or with an overexpanded jet nozzle.

Silencers as shown in FIGS. 24, 25, 26 and 28 are useful when it is preferable to keep the silencer length and exit diameter the same as the preferred silencer length and diameter for the given nozzle size, but operating inlet pressure is below 80 psi. This will enable silencing to occur at inlet pressures less than 80 psi—typically between 70 and 80 psi—without scaling the silencer dimensions in accordance with the scaling rules presented.

Figure 40:
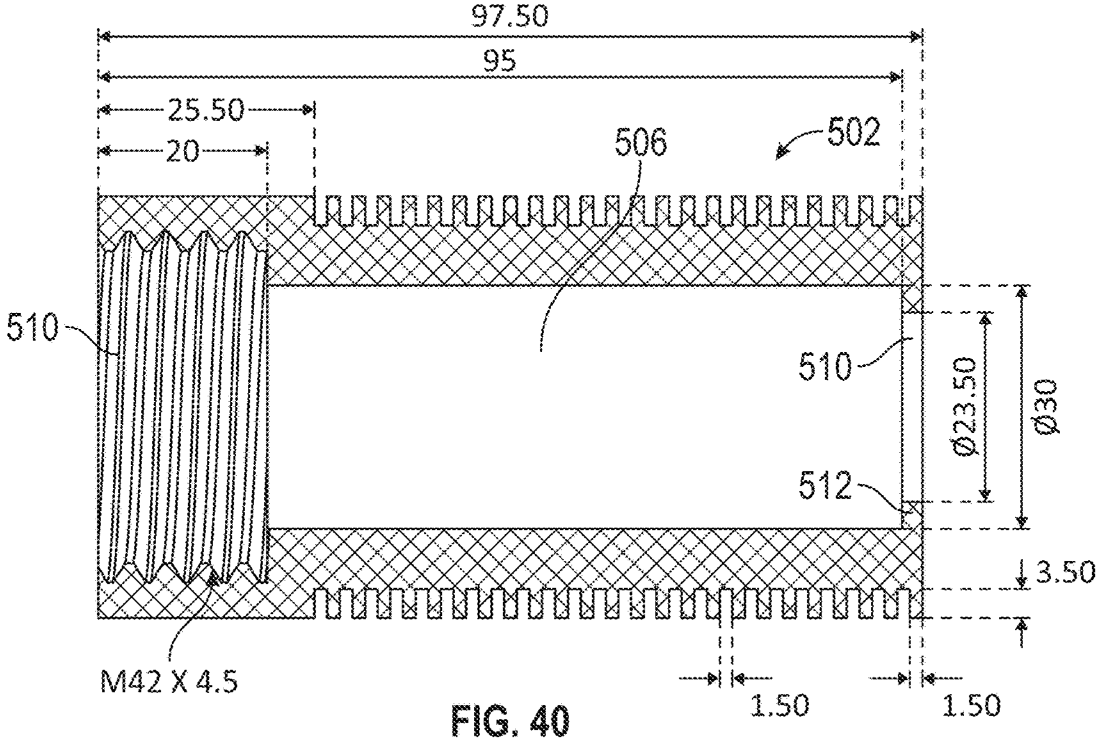
FIG. 40 is a cross sectional side view along the line C-C of the silencer of FIGS. 38 and 39.
Figure 41:
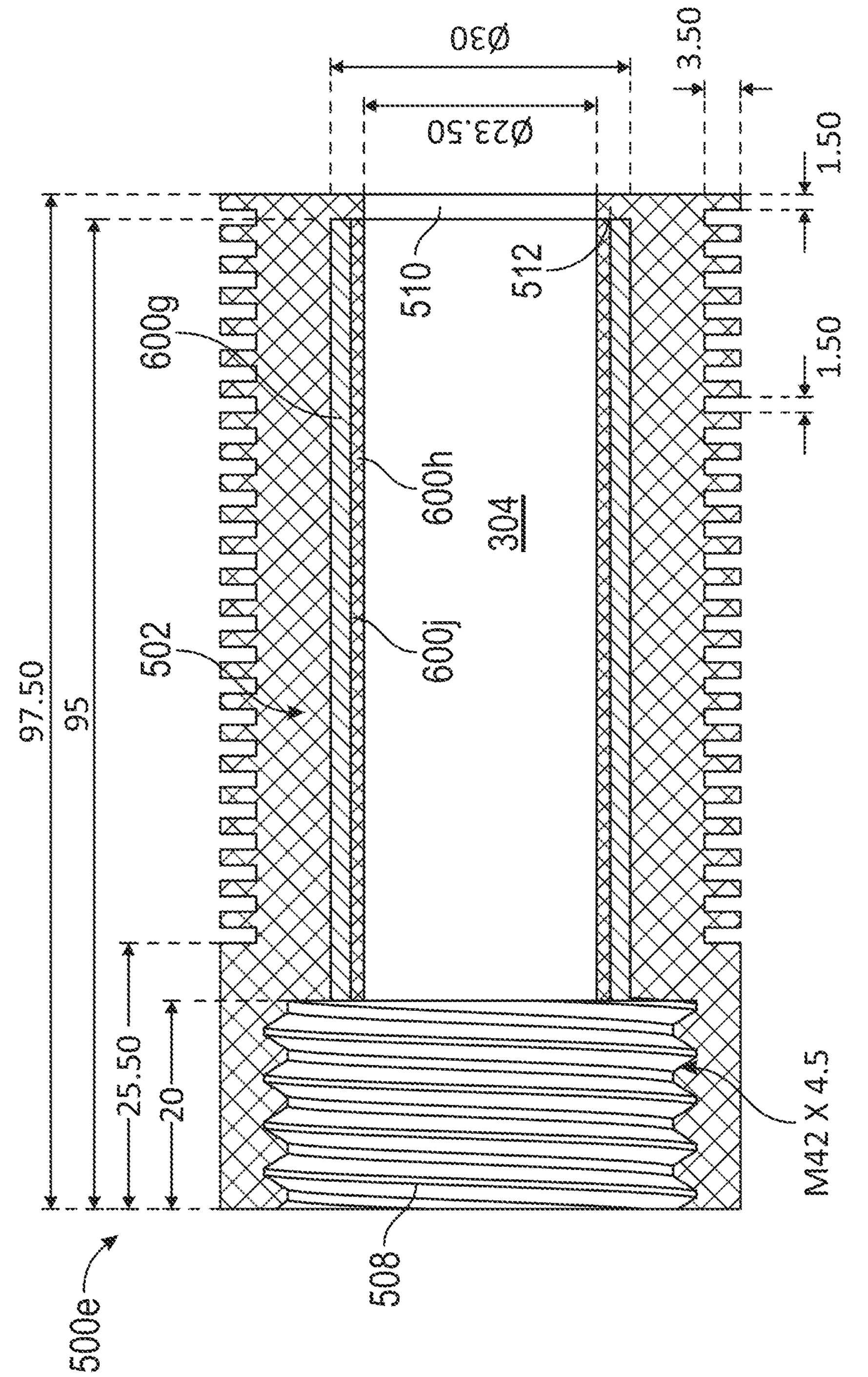
FIG. 41 is a longitudinal cross section through a further silencer having a body comprised of an outer housing with coaxial first and second inner housings wherein the first and second inner housings are of different acoustic densities for creating a reflective interface therebetween.
Figure 42:
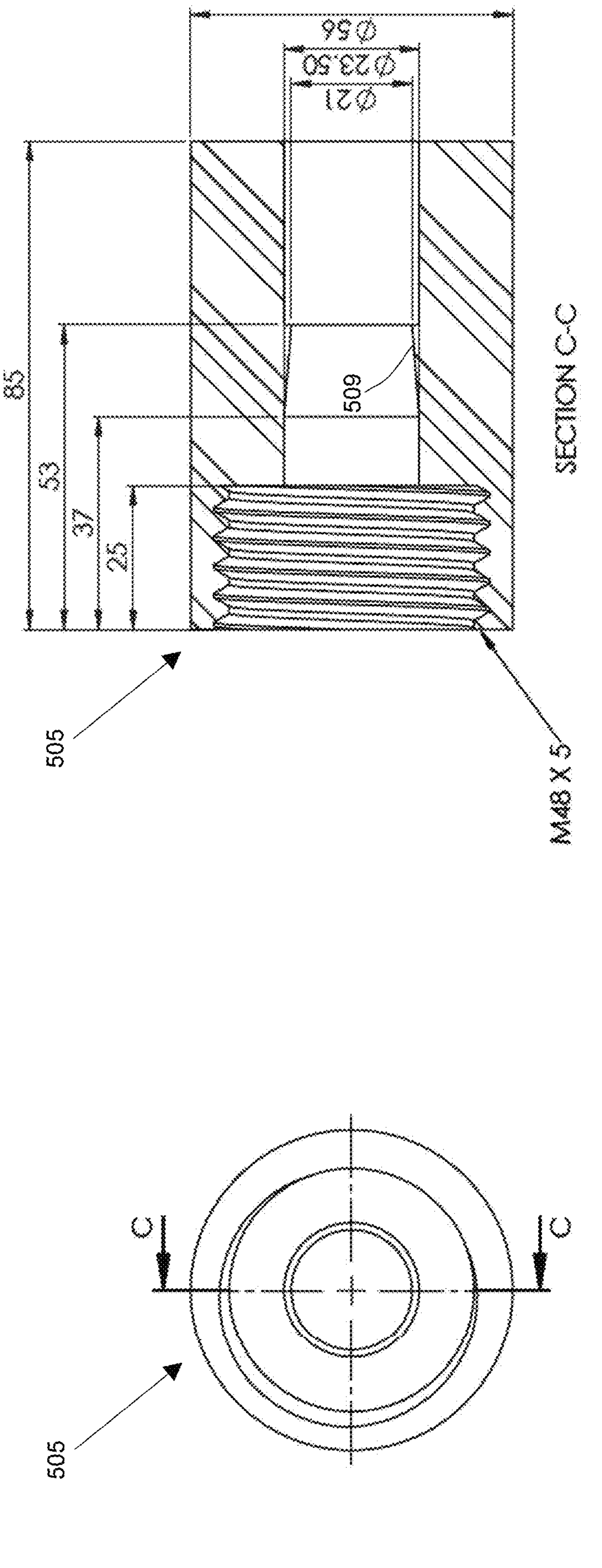
FIG. 42 is a plan view and a cross section view along the line C-C of a further silencer having a liner comprised of an internal ramp and step for improved silencing performance for use with nozzles creating a supersonic—in this case inlet pressure greater than 80 psi.

FIGS. 40 to 42 are a front, side and top isometric view, rear plan view and longitudinal cross section view of a housing 502. Housing 502 includes a longitudinal liner conduit 506 which extends from a coupling formation in the form of a female thread 508, for coupling to a male threaded end of a blast nozzle, to an outlet 510. Outlet 510 is concentric with the liner conduit 506 but of a lesser diameter so that an inwardly extending peripheral lip 512 is formed about outlet 510 at the remote end of the liner conduit 506.

The design and material of construction of the silencer may also contribute to the sound reduction performance. Differing material may be used in the construction of the silencer. As there has been found to be a wide range of frequencies generated by the jet stream, the silencer may include urethanes and plastics, metal and ceramic to dissipate and reflect any sound waves generated across a range of frequencies from 10 Hz to about 10,000 Hz. With reference to FIG. 41, two concentric liners, comprising an inner liner 600*h* and an outer liner 600*g* have been used for nozzle 500*e*. The Inventors have found that coupling hard materials such as metal and ceramic as an inner liner 600*h*, with a softer outer liner 600*g*, such as urethane or plastic improves sound absorption. The improved sound absorption is believed to be due to the interface 600*j* between the two liners 600*h*, 600*g*, which are comprised of material with different densities, producing a boundary that creates a reflection of sound waves.

It was also found that, due to the expansion of the jet post the exit of the nozzle tip, abrasive particles in the jet contact the surface of the inner silencer body at high velocity. Embodiments of the silencer may therefore include an abrasive resistant surface such as steel or ceramic to prevent premature wear of the silencer.

Referring again to FIG. 16, there is shown a graph of the sound pressure generated by a #6 un-silenced substantially ideally expanded nozzle compared to the same nozzle using the silencer of FIGS. 18 to 22 over frequency bands from 6.3 Hz to 20 kHz. The region identified as "A" in the graph of FIG. 16 has a significant, unsilenced, loudness peak of 130 dB. It will be observed that the use of the silencer reduces the peak, as indicated by arrow "B" by approximately 23 dB to 107 dB thereby providing a very significant noise reduction for an operator of the nozzle. Reductions are also observed at other frequencies.

Additionally, through experiment the inventors have shown that a silencer 505 with an internal ramp 509 as shown in FIG. 43, will increase the silencing effect when operated at or near to the ideal supply pressure +−20%—for a given nozzle area ratio.

Ramp 509 is an example of a change to the internal geometry of a silencer that may improve performance by providing a single or multiple ramp and step at some axial location downstream of the nozzle exit as shown in FIG. 43. Ramp 509 is positioned to mostly not interfere with the internal shocks generated by an effective silencer. The inclusion provides further expansion to the flow exiting the nozzle similar to that of the initial step of the silencer after the nozzle exit. This second expansion assists in further improving noise reduction and thrust reduction by introducing a second recirculation region after the step, in a similar manner to that of the main silencer body. This further reduces the pressure in the silencer which assists in thrust reduction and increases overall silencer performance through improving one or more of the primary silencing mechanisms (i.e. increasing the turbulence in the shear layer, increasing the integrity of the annular jet, improving the 1 and ½ shock formation in the silencer body).

In compliance with the statute, the subject matter disclosed herein has been described in language more or less specific to structural or methodical features. The term "comprises" and its variations, such as "comprising" and "comprised of" is used throughout in an inclusive sense and not to the exclusion of any additional features.

It is to be understood that the disclosure is not limited to specific features shown or described since the means herein described comprises preferred forms of putting the disclosed subject matter into effect.

The invention claimed is:

1. A noise suppressed blasting system comprising:

a source of blasting gas in a predetermined pressure range with abrasive particles entrained therein;

a blast nozzle comprises a nozzle inlet for connection, in use, to the source of blasting gas, a nozzle outlet for emission of the blasting gas, and a nozzle conduit) from the nozzle inlet to the nozzle outlet including a throat therebetween, wherein the blast nozzle has a nozzle outlet area (A) and a nozzle throat area (A*), wherein a ratio (A/A*) of the nozzle outlet area (A) to the throat area (A*) is selected so that in use blasting gas is emitted from the blast nozzle as a supersonic jet;

a silencer connected, in use, to the blast nozzle to suppress operational noise of the blast nozzle, wherein the silencer comprises a silencer body with a silencer conduit therethrough, the silencer body having a length and diameter configured to cause a flow condition of a jet received from the nozzle outlet to be modified such that 1½ shock cells are created in a jet inside the silencer, and wherein no shock cells are created in a jet outside the silencer, and wherein a jet, in use, exits the silencer in the form of a core jet with an established turbulent shear layer thereabout and entraining an annular jet located around the core jet;

wherein the silencer body includes a coupling portion arranged to connect to a portion of the blast nozzle adjacent the nozzle outlet and a sound suppression portion defining the silencer conduit, wherein the sound suppression portion extends from the coupling portion to a silencer outlet of the silencer;

wherein the predetermined pressure range is 80 psi (551.58 kPa) to 120 psi (827.37 kPa) and the nozzle has an area ratio A/A* of 1.63±5%;

wherein the nozzle comprises a #7 nozzle; and and wherein the length of the silencer is between 17.5 mm and 157.5 mm and the diameter (Ds) of the silencer is between 23 mm and 31.5 mm.

2. The noise suppressed blasting system of claim 1, wherein the silencer body includes an insert that is removably received within the silencer conduit of the silencer body.

3. The noise suppressed blasting system of claim 2, wherein the insert comprises a removable sleeve that is removably received within the body.

* * * * *